(12) United States Patent
Garcia et al.

(10) Patent No.: US 10,954,891 B2
(45) Date of Patent: Mar. 23, 2021

(54) HYBRID METAL COMPOSITE STRUCTURES, JOINT STRUCTURES, AND RELATED METHODS

(71) Applicant: Northrop Grumman Innovation Systems, Inc., Plymouth, MN (US)

(72) Inventors: Benjamin W. C. Garcia, Tremonton, UT (US); Brian Christensen, Willard, UT (US); David R. Nelson, Logan, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 159 days.

(21) Appl. No.: 16/035,020

(22) Filed: Jul. 13, 2018

(65) Prior Publication Data

US 2020/0018260 A1  Jan. 16, 2020

(51) Int. Cl.
*F02K 9/34* (2006.01)
*F02K 9/97* (2006.01)
(Continued)

(52) U.S. Cl.
CPC .............. *F02K 9/343* (2013.01); *B64G 1/403* (2013.01); *F02K 9/346* (2013.01); *F02K 9/97* (2013.01); *B32B 7/08* (2013.01); *B32B 9/047* (2013.01); *B32B 15/04* (2013.01); *B32B 18/00* (2013.01); *B32B 2250/42* (2013.01);
(Continued)

(58) Field of Classification Search
CPC ......... B64G 1/403; F02K 9/343; F02K 9/346; F02K 9/97; B32B 15/04; B32B 18/00; B32B 2250/42; B32B 2262/105; B32B 2262/106; B32B 2307/306;
(Continued)

(56) References Cited

U.S. PATENT DOCUMENTS 3,748,948 A * 7/1973 Schmitt ................... F16B 4/004
                                                    411/378
5,348,603 A * 9/1994 Yorgason ................ B29C 43/12
                                                    156/172
(Continued)

OTHER PUBLICATIONS

Thakre et al., Solid Propellants, Rocket Propulsion, vol. 2, Encyclopedia of Aerospace Engineering, John Wiley & Sons, Ltd. 2010.

*Primary Examiner* — Frank J Vineis
*Assistant Examiner* — Laura B Figg
(74) *Attorney, Agent, or Firm* — TraskBritt

(57) ABSTRACT

A multi-component structure includes a first hybrid metal composite structure, a second hybrid metal composite structure, and a joint structure. The first and second hybrid metal composite structures include layers, each layer comprising a fiber composite material structure including a fiber material dispersed within a matrix material and at least one metal ply located between layers of the layers. The joint structure extends between and connects the first hybrid metal composite structure and the second hybrid metal composite structure. Additionally, the joint structure exerts a clamping force on the first and second hybrid metal composite structures and to reduce gaps between the layers, between the layers and the at least one metal ply, and between the joint structure and the first and second hybrid metal composite structures to less than half a thickness of the at least one metal ply.

20 Claims, 11 Drawing Sheets

(51) Int. Cl.
 *B64G 1/40* (2006.01)
 *B32B 7/08* (2019.01)
 *B32B 9/04* (2006.01)
 *B32B 15/04* (2006.01)
 *B32B 18/00* (2006.01)

(52) U.S. Cl.
 CPC ... *B32B 2262/105* (2013.01); *B32B 2262/106* (2013.01); *B32B 2307/306* (2013.01); *B32B 2307/54* (2013.01); *F05D 2300/10* (2013.01); *F05D 2300/6032* (2013.01)

(58) Field of Classification Search
 CPC ....... B32B 2307/54; B32B 7/08; B32B 9/047; F05D 2300/10; F05D 2300/603; F05D 2300/6032
 See application file for complete search history.

(56) References Cited

U.S. PATENT DOCUMENTS

| | | |
|---|---|---|
| 2007/0154680 A1* | 7/2007 | Escobar Benavides .. B32B 7/08 428/99 |
| 2009/0020646 A1* | 1/2009 | Normand ................ B64C 1/069 244/120 |
| 2018/0056632 A1 | 3/2018 | Garcia et al. |
| 2018/0126702 A1 | 5/2018 | Garcia et al. |
| 2018/0179990 A1 | 6/2018 | Garcia et al. |

* cited by examiner

HYBRID METAL COMPOSITE STRUCTURES, JOINT STRUCTURES, AND RELATED METHODS

STATEMENT REGARDING FEDERALLY SPONSORED RESEARCH OR DEVELOPMENT

This invention was made with government support under Contract No. FA8814-16-C-0010 awarded by the United States Department of Defense. The government has certain rights in the invention.

TECHNICAL FIELD

Embodiments disclosed herein relate to multi-component structures including hybrid metal composite structures and joint structures, and to methods for joining the hybrid metal composite structures.

BACKGROUND

Fiber composite materials include reinforcing fibers embedded in a matrix material. One example of a fiber composite material is a carbon fiber composite (CFC), which includes reinforcing carbon fibers embedded in a matrix material. CFCs may exhibit a variety of desired properties, such as high temperature stability, high thermal resistance, high mechanical integrity, light weight, corrosion resistance, and desired electrical and magnetic properties. By way of a non-limiting example, CFCs may exhibit a greater strength at a lower overall weight than metal materials. CFCs can thus be used to form a number of structures for industrial and military uses including, for example, aerospace, marine, and automotive structures requiring one or more of the aforementioned properties.

Structures formed of composite materials have been coupled together to form components of rocket motors, such as rocket motor casings. However, fiber composite materials may exhibit an increased stress concentration at locations proximate the fasteners (e.g., bolts, rods, pins, etc.) used to couple the fiber composite material structures together. Accordingly, the resulting assembly may exhibit a low bearing strength at locations proximate the fasteners. To overcome such problems, it is known to manufacture fiber composite material structures to have an increased thickness at locations where the fiber composite material structure will be coupled to another material structure (e.g., another fiber composite material structure). In some instances, the fiber composite materials of such structures may be two to three times thicker proximate the fastener regions than in other regions thereof. Unfortunately, increasing the thickness of the fiber composite materials proximate the fastener regions undesirably increases an overall weight of a fiber composite material assembly formed of and including the fiber composite material structures.

Methods of improving the bearing strength of a fiber composite material without increasing the thickness thereof include placing thin metallic structures (e.g., thin metal plies) in the fiber composite material to form a hybrid metal composite structure comprising the fiber composite material and the metal plies. The metal plies may reduce an overall weight of the structure by as much as about 30 percent. In some applications, this reduction in weight may correspond to a reduction in thousands of pounds. However, fabrication of composite structures including metal plies is difficult due to, among other things, poor adhesion of the metal ply surfaces to the resin of the fiber composite material. Poor adhesion may result in delamination of the metal ply from the hybrid metal composite structure and failure of the hybrid metal composite structure.

BRIEF SUMMARY

Embodiments disclosed herein include a multi-component structure. The multi-component structure may include a first hybrid metal composite structure, a second hybrid metal composite structure, and a joint structure. Each of the first and second hybrid metal composite structures may include layers including a fiber composite material structure and at least one metal ply located between layers of the layers. The joint structure may extend between and connecting the first hybrid metal composite structure and the second hybrid metal composite structure. Additionally, the joint structure may be configured to exert a clamping force on the first and second hybrid metal composite structures to reduce any gaps between the layers of the first and second hybrid metal composite structures, between the layers and the at least one metal ply of the first and second hybrid metal composite structures, and between the joint structure and the first and second hybrid metal composite structures to less than half a thickness of the at least one metal ply.

Additional embodiments of the present disclosure include a multi-component structure. The multi-component structure may include a first hybrid metal composite structure, a second hybrid metal composite structure, and a joint structure. The joint structure may extend between and connecting the first hybrid metal composite structure and the second hybrid metal composite structure, and the joint structure may be configured to exert a clamping force on the first and second hybrid metal composite structures to reduce gaps between the joint structure and the first and second hybrid metal composite structures to less than about 0.010 inch. The joint structure may include a first set of plates disposed on opposite sides of and in contact with the first hybrid metal composite structure, a first set of fasteners extending between the first set of plates and through the first hybrid metal composite structure, a second set of plates disposed on opposite sides of and in contact with the second hybrid metal composite structure, a second set of fasteners extending between the first set of plates and through the first hybrid metal composite structure, a first connector structure disposed on a first side of the first hybrid metal composite structure and the second hybrid metal composite structure, contacting the first set of plates, and extending between the first hybrid metal composite structure and the second hybrid metal composite structure, a second connector structure disposed on a second opposite side of the first hybrid metal composite structure and the second hybrid metal composite structure, contacting the second set of plates, and extending between the first hybrid metal composite structure and the second hybrid metal composite structure, a first principal fastener extending from the first connector structure, through the first hybrid composite structure, and to the second connector structure, and a second principal fastener extending from the first connector structure, through the second hybrid composite structure, and to the second connector structure.

Some embodiments of the present disclosure include a joint structure for joining a first hybrid metal composite structure to a second hybrid metal composite structure. The joint structure may include a first connector structure configured to be disposed on a first side of the first hybrid metal composite structure and the second hybrid metal composite structure and configured to extend between the first hybrid metal composite structure and the second hybrid metal composite structure, a second connector structure configured to be disposed on a second opposite side of the first hybrid metal composite structure and the second hybrid metal composite structure and configured to extend between the first hybrid metal composite structure and the second hybrid metal composite structure; a first principal fastener configured to extend from the first connector structure, through the first hybrid composite structure, and to the second connector structure; and a second principal fastener configured to extend from the first connector structure, through the second hybrid composite structure, and to the second connector structure. The joint structure may be configured to exert a clamping force on the first and second hybrid metal composite structures to reduce gaps between the between the joint structure and the first and second hybrid metal composite structures to less than half a thickness of at least one metal ply within the first and second hybrid metal composite structures.

Additional embodiments include a method of forming a multi-component structure. The method may include forming a first hybrid metal composite structure and a second hybrid metal composite structure, the first and second hybrid metal composite structures including layers comprising a fiber composite material structure and at least one metal ply located between layers of the layers, disposing a joint structure between the first hybrid metal composite structure and the second hybrid metal composite structure, and causing the joint structure to exert a clamping force on the first and second hybrid metal composite structures to reduce gaps between the layers of the first and second hybrid metal composite structures, between the layers and the at least one metal ply of the first and second hybrid metal composite structures, and between the joint structure and the first and second hybrid metal composite structures to less than half a thickness of the at least one metal ply.

Further embodiments of the present disclosure include a rocket motor. The rocket motor may include a first hybrid metal composite structure, a second hybrid metal composite structure, and a joint structure. Each of the first and second hybrid metal composite structures may include layers comprising a fiber composite material structure and at least one metal ply located between layers of the layers. The joint structure may extend between and may connect the first hybrid metal composite structure and the second hybrid metal composite structure. The joint structure may be configured to exert a clamping force on the first and second hybrid metal composite structures to reduce gaps between the layers of the first and second hybrid metal composite structures, between the layers and the at least one metal ply of the first and second hybrid metal composite structures, and between the joint structure and the first and second hybrid metal composite structures to less than half a thickness of the at least one metal ply.

DETAILED DESCRIPTION

Figure 1:
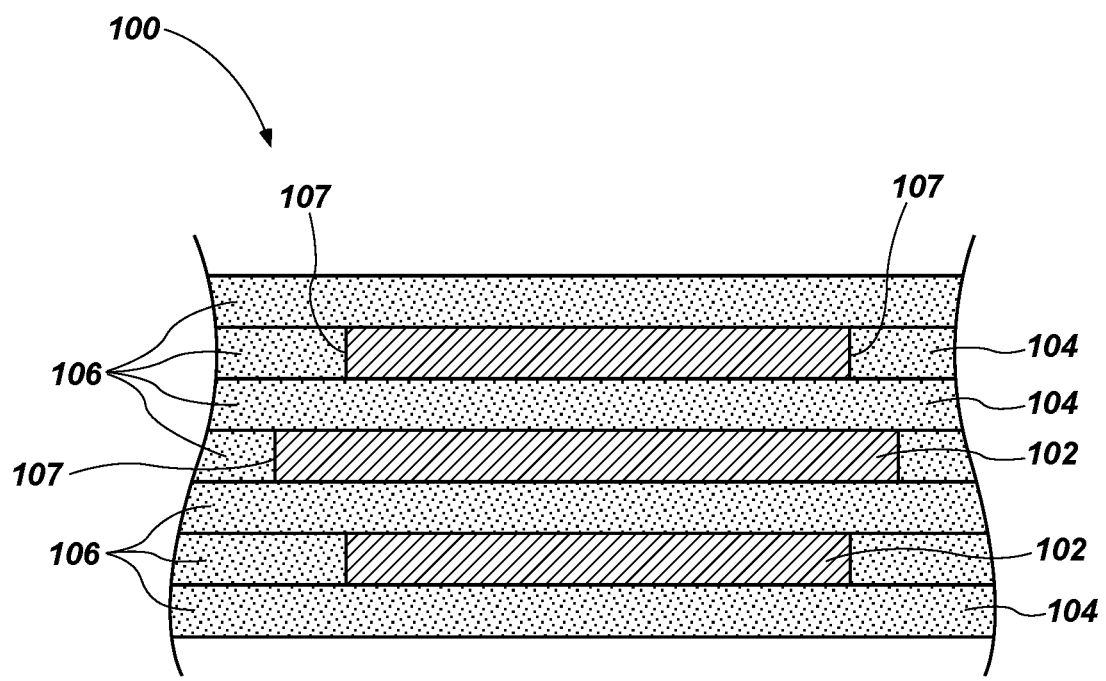
FIG. 1 is a simplified cross-sectional view of a hybrid metal composite structure, according to embodiments of the disclosure.

The illustrations included herewith are not meant to be actual views of any particular systems or hybrid metal composite structures, but are merely idealized representations that are employed to describe embodiments herein. Elements and features common between figures may retain the same numerical designation except that, for ease of following the description, for the most part, reference numerals begin with the number of the drawing on which the elements are introduced or most fully described.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "lower," "upper," etc., is used for clarity and convenience in understanding the disclosure and accompanying drawings, and does not connote or depend on any specific preference or order, except where the context clearly indicates otherwise. For example, these terms may refer to orientations of elements of joint structures, hybrid metal composite structures, and/or rocket motors in conventional orientations. Furthermore, these terms may refer to orientations of elements of joint structures, hybrid metal composite structures, and/or rocket motors as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.)

The following description provides specific details, such as material types, material thicknesses, and processing conditions in order to provide a thorough description of embodiments described herein. However, a person of ordinary skill in the art will understand that the embodiments disclosed herein may be practiced without employing these specific details. Indeed, the embodiments may be practiced in conjunction with conventional fabrication techniques employed in the composite industry. In addition, the description provided herein does not form a complete description of a hybrid metal composite structure, a joint structure, or a complete process flow for processing a metal ply to be used in hybrid metal composite structures and the structures described below may not necessarily form a complete hybrid metal composite structure. Only those process acts and structures necessary to understand the embodiments described herein are described in detail below. Additional acts to form a complete hybrid metal composite structure including the structures described herein may be performed by conventional techniques.

Some embodiments of the present disclosure include a multi-component structure that includes at least one hybrid metal composite structure comprising a joint structure. The hybrid metal composite (HMC) structure may include one or more metal plies (e.g., metal sheets) disposed in a fiber composite material structure, such as a carbon fiber composite (CFC) material structure. The metal plies may be disposed within the hybrid metal composite structure proximate locations of the hybrid metal composite structure that will be coupled to, for example, another hybrid metal composite structure. The joint structure may include connector structures coupled together with fasteners. The fasteners may extend through the hybrid metal composite structures and through the one or more metal plies within the hybrid metal composite structures. The joint structure may apply (e.g., may be configured to apply) a clamping force, as will be understood in the art, on the hybrid metal composite structures to reduce any gaps between the layers of the hybrid metal composite structures, between the layers and the one or more metal plies, and between the joint structure and the hybrid metal composite structures to less than half a thickness of the one or more metal plies.

Without being bound by any theory, reducing the gaps described herein (e.g., by compaction, compression) may increase strength (e.g., bearing strength) of the joint structure and, ultimately, a durability of the multi-component structure (e.g., rocket casing). For instance, reducing the gaps may minimize buckling of the metal plies near outer surfaces of the hybrid metal composite structures. Increasing a bearing strength of the joint structure may enable the hybrid metal composite structures of the multi-component structure and the joint structure to be subjected to greater loads. As a result of the foregoing, multi-component structures (e.g., rocket motors, casing, etc.) formed from the hybrid metal composite structures and joint structures of the present disclosure may exhibit higher reliabilities, increased breadth of utilities, increased performance, etc. Additionally, reducing and/or eliminating the gaps may reduce a probability of delamination (e.g., separation) between different layers of the layers of the hybrid metal composite structures. For example, reducing the gaps may cause the hybrid metal composite structures to be less sensitive to adhesion performance and delamination events between the metal plies and a remainder of the hybrid metal composite structures by compressing the metal plies within a matrix and maximizing friction force between layers. The foregoing is particularly advantageous for hybrid metal composite structures where adhesion between dissimilar materials is relatively difficult to achieve.

FIG. 1 shows a cross-sectional side view of a hybrid metal composite (HMC) structure 100, according to one or more embodiments of the disclosure. The hybrid metal composite structure 100 may include one or more metal plies (e.g., metal sheets) 102 disposed in a fiber composite material structure 104. The metal plies 102 may be substantially surrounded on all sides thereof with the fiber composite material structure 104. In some embodiments, surfaces of the metal plies 102 may adhere (e.g., chemically bond) to a matrix material of the fiber composite material structure 104. Furthermore, the metal plies 102 may be oriented at least substantially parallel to each other.

In one or more embodiments, the hybrid metal composite structure 100 may include layers 106. Furthermore, each layer of the layers 106 may include at least a portion of fiber composite material structure 104. For example, a first layer 106 of the layers 106 may at least substantially (e.g., entirely) comprise the fiber composite material structure 104. A second layer 106 of the layers 106, disposed over the first layer 106 may comprise the fiber composite material structure 104 and at least one metal ply 102. The at least one metal ply 102 of the second layer 106 may be substantially surrounded by the fiber composite material structure 104 of both of the first and second layers 106. A third layer 106 of the layers 106 overlying the at least one metal ply 102 of the second layer 106 may at least substantially (e.g., entirely) comprise the fiber composite material structure 104. Although FIG. 1 illustrates seven layers 106, the disclosure is not so limited, and the hybrid metal composite structure 100 may include any number of layers (e.g., three, four, five, six, eight, nine, etc.). For example, in some embodiments, the hybrid metal composite structure 100 may include greater than or equal to nine (9) layers 106, greater than or equal fifteen (15) layers 106, greater than or equal to twenty-five (25) layers 106, or greater than or equal to fifty (50) layers 106. In other embodiments, the hybrid metal composite structure 100 may include less than or equal to five (5) layers 106 or less than or equal to three (3) layers 106.

In some embodiments, alternating layers 106 of the layers 106 may include at least one metal ply 102, with intervening layers 106 at least substantially comprising the fiber composite material structure 104 and not including (e.g., being free of) at least one metal ply 102. Accordingly, in some embodiments, every other layer 106 of the layers 106 of the hybrid metal composite structure 100 may include at least one metal ply 102. In alternative embodiments, the hybrid metal composite structure 100 may include any number of layers 106 intervening between layers 106 including at least one metal ply 102. By way of a non-limiting example, two, three, four, or more layers 106 without a metal ply 102 may intervene between two layers 106 comprising at least one metal ply 102. Furthermore, in some embodiments, consecutive layers of the layers 106 of the hybrid metal composite structure 100 may include metal plies 102.

In some embodiments, lateral edges 107 (e.g., sidewalls) of the metal ply 102 in one layer 106 may be laterally offset from lateral edges 107 of a metal ply 102 in at least another layer 106. In some embodiments, each layer 106 of the layers 106 may include at least one metal ply 102 laterally offset from a metal ply 102 in an adjacent layer 106 such that the metal plies 102 are substantially surrounded by the fiber composite material structure 104 and do not include any overlapping surfaces.

In one or more embodiments, the fiber composite material structure 104 may be independently formed of and include fibers and a matrix material. The fibers may be at least partially (e.g., substantially) surrounded (e.g., enveloped) by the matrix material. In some embodiments, the fiber composite material structure 104 includes reinforcing fiber materials dispersed within a matrix material. The fiber composite material structure 104 may include a fiber preform (e.g., a carbon fiber preform) infiltrated with a matrix material. As used herein, the term "fiber preform" means and includes a structure formed of and including fibers. The fiber preform may comprise a single tow of fibers (e.g., a substantially unidirectional bundle of fibers), a tape of multiple tows of the fibers stitched together using another material, such as a glass material, or a woven fabric of multiple tows of the fiber (e.g., a plain weave of the multiple tows, a 4-harness satin weave of the multiple tows, a 5-harness satin weave of multiple tows, an 8-harness satin weave of the multiple tows, etc.). In some embodiments, at least some of the fibers are provided as a 12 k fiber tow (i.e., a bundle of about 12,000 fibers). The fiber preform may have any dimension (e.g., length, width, thickness) compatible with an apparatus or method of forming the hybrid metal composite structure 100. In other embodiments, the fiber composite material structure 104 comprises a filament wound fiber composite material (such as a composite material formed by wet winding or dry winding), a pre-preg fiber composite material, a fiber mesh, a cloth comprising the fiber material (such as a pre-preg fiber material), or combinations thereof.

The fibers may be formed of and include any material(s) compatible with the other components (e.g., the matrix material of the fiber composite material structure 104, the metal plies 102, etc.) of the hybrid metal composite structure 100. As used herein, the term "compatible" when used in reference to a material means and indicates that the material does not react with, break down, or absorb another material in an unintended way, and does not impair the chemical and/or mechanical properties of the another material in an unintended (e.g., undesired) way. By way of a non-limiting example, the fibers may be formed of and include one or more of carbon fibers, ceramic fibers (e.g., oxide-based ceramic fibers, such as one or more of alumina fibers, alumina-silica fibers, and alumina-boria-silica fibers; non-oxide-based ceramic fibers, such as one or more of silicon carbide (SiC) fibers, silicon nitride (SiN) fibers, fibers including SiC on a carbon core, SiC fibers containing titanium, silicon oxycarbide fibers, silicon oxycarbonitride fibers; etc.), polymeric fibers (e.g., thermoplastic fibers, such as one or more of polyethylene (PE) fibers, polypropylene (PP) fibers, polystyrene (PS) fibers, polyvinyl chloride (PVC) fibers, poly(methyl methacrylate) (PMMA) fibers, polycarbonate (PC) fibers, polyphenylene oxide (PPO) fibers, polyetherketone (PEK) fibers, polyetheretherketone (PEEK) fibers, polyaryletherketone (PAEK) fibers, polyetherketoneketone (PEKK) fibers, polyetherketoneetherketoneketone (PEKEKK) fibers, polyether sulfone (PES) fibers, polyphenylene sulfide (PPS) fibers, polyphenylsulfone (PPSU) fibers, self-reinforced polyphenylene (SRP) fibers, aromatic polyamide (PA) fibers, and polyamideimide (PAI) fibers; thermoset plastic fibers, such as one or more of polyimide (PI) fibers, polyurethane (PU) fibers, phenol-formaldehyde fibers, urea-formaldehyde fibers, polyester fibers; etc.), glass fibers, boron fibers, and other fibers. A material composition of the fibers of each of the fiber composite material structures 104 may be selected for compatibility relative to a material composition of the matrix material of each of the fiber composite material structures 104, as described further detail below. In some embodiments, the fibers of one or more of the fiber composite material structures 104 include carbon fibers. In other embodiments, the fiber includes more than one type of material (e.g., carbon fibers and at least another type of fiber material). In some such embodiments, adjacent layers 106 of the layers 106 may include fiber composite material structures 104 having different fiber materials.

In some embodiments, the fibers may constitute from about 10 volume percent (vol %) to about 90 volume percent of the fiber composite material structure 104. For instance, the fibers may constitute from about 25 volume percent and about 75 volume percent, or from about 40 volume percent and about 60 volume percent of the fiber composite material structure 104.

The fibers may have any desired dimensions (e.g., lengths, widths, thicknesses) compatible with a desired end use of the hybrid metal composite structure 100. In some embodiments, the fiber material comprises intermediate modulus fibers, such as intermediate modulus carbon fibers, meaning that the fibers have a tensile moduli within a range of from about 200 Gigapascals (GPa) to about 350 GPa (e.g., within a range of from about 275 GPa to about 350 GPa). In some embodiments, the fibers exhibit a tensile modulus of about 350 GPa. In other embodiments, the fibers exhibit a tensile modulus of about 275 GPa. Each of the fibers may independently have a diameter within a range of from about 1 μm to about 100 μm (e.g., from about 1 μm to about 5 μm, from about 5 μm to about 10 μm, from about 10 μm to about 50 μm, from about 50 μm to about 100 μm, etc.). In some embodiments, at least some of the fibers are provided as an intermediate modulus 12 k fiber tow (i.e., a bundle of about 12,000 fibers), such as an intermediate modulus 12 k carbon fiber tow. Suitable intermediate modulus 12 k fiber tows are commercially available from numerous sources, such as from Hexcel Corporation of Stamford, Conn. under the HEXTOW® trade name (e.g., HEXTOW® IM7 Carbon Fiber).

The matrix material may be formed of and include any material(s) compatible with the other components (e.g., the fibers of the fiber composite material structure 104, the metal plies 102, etc.) of the hybrid metal composite structure 100. The matrix material of each fiber composite material structure 104 may be selected relative to the fibers of the respective fiber composite material structure 104 to impart the fiber composite material structure 104 with desirable mechanical properties. By way of a non-limiting example, the matrix material may be formed of and include one or more of a polymer-derived ceramic material or a ceramic material (e.g., an oxide ceramic material, such as one or more of an alumina material, an alumina-silica material, an alumina-boria-silica material, a zirconia material, etc.; a non-oxide ceramic material, such as one or more of a SiC material, a SiN material, a silicon hexaboride material, an aluminum nitride material, a boron nitride material, a boron carbide material, a titanium boride material, a titanium carbide material, and a hafnium carbide material), a polymeric material (e.g., an epoxy material; a thermoplastic polymer material, such as one of more of a PE material, a PP material, a PS material, a PVC material, a PMMA material, a PC material, a PPO material, a PEK material, a PEEK material, a PAEK material, a PEKK material, a PEKEKK material, a PES material, a PPS material, a PPSU material, a polyphenylene material, a PA material, and a PAI material; thermoset plastic material, such as one or more of a PI material, a PU material, a phenol-formaldehyde material, a urea-formaldehyde material, and a polyester material), a glass material, a carbon-containing material, a boron-containing material, or other thermoplastic or thermosetting materials. In some embodiments, the matrix material may include an epoxy material.

In some embodiments, the matrix material may constitute from about 10 volume percent to about 90 volume percent of the fiber composite material structure 104. For instance, the matrix material may constitute from about 25 volume percent to about 75 volume percent, or from about 40 volume percent to about 60 volume percent of the fiber composite material structure 104.

Each of the layers 106 of the layers 106 (and, therefore, each of the fiber composite material structures 104) may independently include any desired thickness (e.g., height), such as a thickness less than or equal to about 0.030 inch (less than or equal to about 762 micrometers (μm)) (e.g., less than or equal to about 0.020 inch (less than or equal to about 508 μm), less than or equal to about 0.015 inch (less than or equal to about 381 μm), less than or equal to about 0.005 inch (less than or equal to about 127 μm), less than or equal to about 0.003 inch (less than or equal to about 76.2 μm), less than or equal to about 0.001 inch (less than or equal to about 25.4 μm); etc.). In layers 106 of the layers 106 including at least one fiber composite material structure 104 and at least one metal ply 102, the thickness of the fiber composite material structure 104 may correspond to (e.g., be the same as) a thickness of the metal ply 102.

The fiber composite material structures 104 in each layer 106 of the layers 106 may have substantially the same material composition and thickness, or at least one of the fiber composite material structures 104 may have one or more of a different material composition and a different thickness than at least one other of the fiber composite material structures 104. In some embodiments, each of the fiber composite material structures 104 has substantially the same material composition and thickness as each other of the fiber composite material structures 104. In other embodiments, each of the fiber composite material structures 104 exhibits substantially the same material composition, but at least one of the fiber composite material structures 104 exhibits a different thickness than at least one other fiber composite material structure 104. In further embodiments, each of the fiber composite material structures 104 exhibits substantially the same thickness, but at least one fiber composite material structure 104 exhibits a different material composition than at least one other fiber composite material structure 104. In yet further embodiments, one or more (e.g., each) of the fiber composite material structures 104 exhibits a different material composition and a different thickness than one or more (e.g., each) other of the fiber composite material structures 104.

With continued reference to FIG. 1, each of the metal plies 102 may independently be formed to include a metal-containing material capable of imparting the hybrid metal composite structure 100 with enhanced strength and structural integrity as compared to composite material structures not including the metal plies 102. For example, each of the metal plies 102 may independently be formed of and include iron (Fe), cobalt (Co), nickel (Ni), copper (Cu), aluminum (Al), magnesium (Mg), titanium (Ti), tungsten (W), molybdenum (Mo), niobium (Nb), vanadium (V), hafnium (Hf), tantalum (Ta), chromium (Cr), zirconium (Zr), silicon (Si), alloys thereof, carbides thereof, nitrides thereof, oxides thereof, or combinations thereof. As a nonlimiting example, one or more (e.g., each) of the metal plies 102 may be formed of and include a metal alloy, such as one or more of an Fe-containing alloy, a Ni-containing alloy, a Co-containing alloy, an Fe- and Ni-containing alloy, a Co- and Ni-containing alloy, an Fe- and Co-containing alloy, an Al-containing alloy, a Cu-containing alloy, a Mg-containing alloy, and a Ti-containing alloy. In some embodiments, one or more (e.g., each) of the metal plies 102 are formed of and include elemental Ti. In additional embodiments, one or more (e.g., each) of the metal plies 102 are formed of and include an Fe-containing alloy (e.g., a steel-alloy, such as a stainless steel, a mild steel, etc.). Each of the metal plies 102 may have substantially the same material composition, or at least one of the metal plies 102 may have a different material composition than at least one other of the metal plies 102.

The metal plies 102 may have material properties (e.g., mechanical properties, rheological properties, physical properties, chemical properties, etc.) substantially compatible with material properties of the fiber composite material structures 104. By way of a non-limiting example, one or more of the metal plies 102 may independently have one or more of a coefficient of thermal expansion, an elastic (e.g., Young's) modulus, a bulk modulus, a tensile strength, a hardness, a thermal resistance, an abrasion resistance, and a chemical resistance substantially similar to that of one or more of the fibers and the matrix material of one or more (e.g., each) of the fiber composite material structures 104. In some embodiments, each of the metal plies 102 has a coefficient of thermal expansion within a range of from about $3 \times 10^{-6}$/K to about $25 \times 10^{-6}$/K at about 25° C., and a coefficient of thermal expansion of the matrix material of each of the fiber composite material structures 104 may be within a range of from about $3 \times 10^{-6}$/K to about $150 \times 10^{-6}$/K at about 25° C., such as from about $20 \times 10^{-6}$/K to about $150 \times 10^{-6}$/K, or from about $45 \times 10^{-6}$/K to about $65 \times 10^{-6}$/K at about 25° C.

The hybrid metal composite structure 100 may include any number of metal plies 102. For clarity and ease of understanding of the drawings and related description, FIG. 1 shows the hybrid metal composite structure 100 as including three (3) metal plies 102. However, the hybrid metal composite structure 100 may include a different number of metal plies. For example, in additional embodiments, the hybrid metal composite structure 100 may include greater than three (3) metal plies 102 (e.g., greater than or equal to five (5) metal plies 102, greater than or equal to nine (9) metal plies 102, greater than or equal to fifteen (15) metal plies 102, greater than or equal to twenty-five (25) metal plies). In other embodiments, the hybrid metal composite structure 100 may include less than three (3) metal plies 102 (e.g., less than two (2) metal plies 102, or only one (1) metal ply 102). The metal plies 102 may constitute from about 1 volume percent to about 50 volume percent of the hybrid metal composite structure 100, such as from about 5 volume percent to about 40 volume percent, or from about 10 volume percent to about 35 volume percent of the hybrid metal composite structure 100.

Each of the metal plies 102 may independently exhibit any desired peripheral dimensions (e.g., width, length, and height) permitting the metal plies 102 to enhance the strength and mechanical (e.g., structural) integrity of a region (e.g., an area, a portion) of the hybrid metal composite structure 100 including the metal plies 102 as compared to another region of the hybrid metal composite structure 100 not including the metal plies 102. Each of the metal plies may independently exhibit a thickness (e.g., a height) less than or equal to about 0.050 inch (less than or equal to about 1270 micrometers (μm)), such as within a range of from about 0.001 inch (about 25.4 μm) to about 0.030 inch (about 762 μm), such as from about 0.003 inch (about 76.2 μm) to about 0.020 inch (about 508 μm), or from 0.005 inch (about 127 μm) to about 0.015 inch (about 381 μm). In some embodiments, one or more of the metal plies 102 exhibits a thickness of about 0.01 inch (about 254 μm). Each of the metal plies 102 may exhibit substantially the same peripheral dimensions (e.g., substantially the same width, substantially the same length, and substantially the same height), or at least one of the metal plies 102 may exhibit one or more different peripheral dimensions (e.g., a different width, a different length, and/or a different height) than at least one other of the metal plies 102. As shown in FIG. 1, a lateral width (i.e., a distance between lateral edges 107)) of the metal ply 102 in one of the layers 106 may be different from a width of a metal ply 102 in another layer 106. In additional embodiments, each of the metal plies 102 in each layer 106 may exhibit substantially the same lateral width.

As shown in FIG. 1, metal plies 102 in different layers 106 than one another may be substantially aligned with each other. In some embodiments, the lateral edges 107 of the metal plies 102 in different layers 106 may be laterally offset from each other. In other embodiments, one or more of the metal plies 102 may be unaligned (e.g., laterally offset from) with one or more of the metal plies in different layers 106, and/or each of the metal plies 102 may exhibit lateral edges 107 substantially coplanar with lateral edges 107 of each of the other metal plies 102.

Each of the metal plies 102 may independently exhibit any peripheral shape compatible with a desired end use of the hybrid metal composite structure 100. By way of non-limiting example, the metal plies 102 may exhibit one or more of rectangular peripheral shapes, square peripheral shapes, trapezoidal peripheral shapes, annular peripheral shapes, circular peripheral shapes, semicircular peripheral shapes, crescent peripheral shapes, ovular peripheral shapes, astroidal peripheral shapes, deltoidal peripheral shapes, ellipsoidal peripheral shapes, triangular peripheral shapes, parallelogram peripheral shapes, kite peripheral shapes, rhomboidal peripheral shapes, pentagonal peripheral shapes, hexagonal peripheral shapes, heptagonal peripheral shapes, octagonal peripheral shapes, enneagonal peripheral shapes, decagonal peripheral shapes, truncated versions thereof, and irregular peripheral shapes. In some embodiments, one or more (e.g., each) of the metal plies 102 exhibits a generally rectangular peripheral shape. Each of the metal plies 102 may exhibit substantially the same peripheral shape, or at least one of the metal plies 102 may exhibit a different peripheral shape than at least one other of the metal plies 102.

Substantially all surfaces of each of the metal plies 102 may be surrounded by the fiber composite material structure 104. At least one surface of the metal ply 102 may be treated to facilitate adhesion between the metal ply 102 and the fiber composite material structure 104. In some embodiments, surfaces of the metal plies 102 may be chemically bonded to the matrix material of the fiber composite material structure 104.

Referring still to FIG. 1, the hybrid metal composite structure 100, the metal plies 102, and fiber composite material structures 104 may be formed by conventional techniques, including those described in, for example, U.S. patent application Ser. No. 15/250,404, to Garcia et al., filed Aug. 29, 2016, U.S. patent application Ser. No. 15/250,536, to Garcia et al., filed Aug. 29, 2016, and U.S. patent application Ser. No. 15/391,016, to Garcia et al., filed Dec. 27, 2016, the disclosures of each of which are incorporated in their entireties by reference herein. Furthermore, the hybrid metal composite structure 100 may include any of the hybrid metal composite structures described in the foregoing disclosures.

Figure 2:
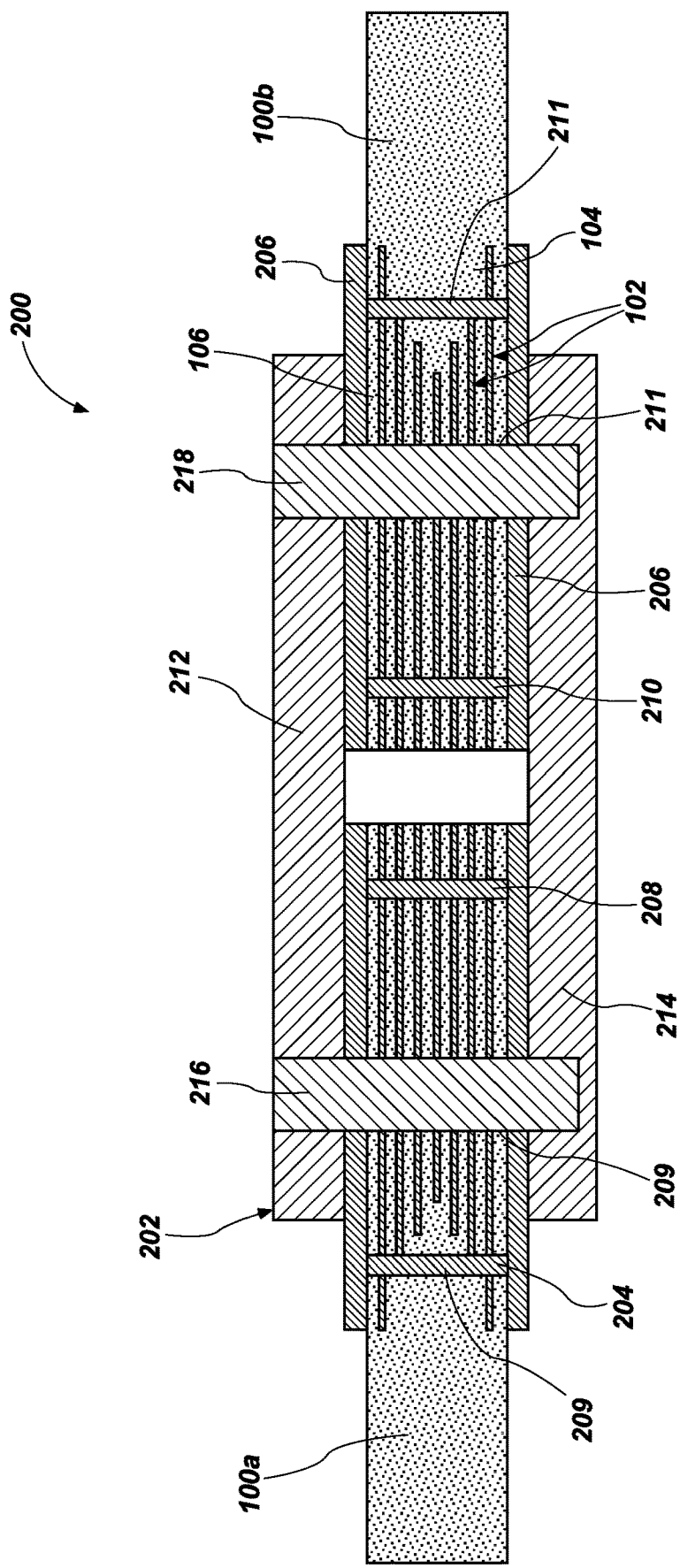
FIG. 2 is a simplified cross-sectional view of a multi-component structure including at least one hybrid metal composite structure and joint structure according to one or more embodiments of the present disclosure.

FIG. 2 is a cross-sectional view of an assembled, multi-component structure 200 including two hybrid metal composite structures 100a, 100b operably coupled together with a joint structure 202 according to one or more embodiments of the present disclosure. The joint structure 202 is configured to join the two hybrid metal composite structures 100a, 100b. The hybrid metal composite structures 100a, 100b of the multi-component structure 200 may include layers of fiber composite material structures 104 and metal plies 102 as previously described. The configurations (e.g., material compositions, peripheral sizes, peripheral shapes, components, component sizes, component shapes, component spacing, component features, component feature sizes, component feature shapes, component feature spacing, component feature density, component feature patterning, etc.) and positions of the fiber composite material structures 104 and the metal plies 102 may be substantially the same as, or may be different than the configurations and positions of the fiber composite material structures 104 and the metal plies 102 previously described with respect to FIG. 1. The configurations of each of the hybrid metal composite structures 100a, 100b may be substantially the same as one another, or may be different. In some embodiments, each of the hybrid metal composite structures 100a, 100b mirror each other. As used herein, the term "mirror" means and includes that at least two structures are mirror images of one another. For example, a first hybrid metal composite structure 100a (e.g., the left hybrid metal composite structure 100a in FIG. 2) and a second hybrid metal composite structure 100b (the right hybrid metal composite structure 100b in FIG. 2) may exhibit substantially the same material compositions, peripheral sizes, peripheral shapes, components (e.g., fiber composite material structures, metal plies, etc.), component sizes, component shapes, component spacing, component features (e.g., perforations, indentations, peaks, valleys, etc., in the metal plies), component feature sizes, component feature shapes, component feature spacing, component feature density, and component feature patterning as one another, but the first hybrid metal composite structure 100a may outwardly extend in a direction that opposes a direction in which the second hybrid metal composite structure 100b outwardly extends. As shown in FIG. 2, in some embodiments, the metal plies of each of the hybrid metal composite structures 100a, 100b are laterally positioned proximate to lateral ends of the hybrid metal composite structures 100 (e.g., proximate to where the hybrid metal composite structures 100 are joined together via the joint structure 202), and do not laterally extend across entireties of the first hybrid metal composite structure 100*a* or the second hybrid metal composite structure 100*b*.

In one or more embodiments, the joint structure 202 may include a first set of plates 204, a second set of plates 206, a first set of fasteners 208, a second set of fasteners 210, a first connector structure 212, a second connector structure 214, a first principal fastener 216, and a second principal fastener 218. The first set of plates 204 may be disposed on opposing sides (e.g., upper and lower sides as depicted in FIG. 2) of the first hybrid metal composite structure 100*a*, and the first set of fasteners 208 may connect the first set of plates 204 by extending through the first hybrid metal composite structure 100*a* (e.g., through bearing holes 209 in the first hybrid metal composite structure 100*a*). For instance, the first set of fasteners 208 may couple the first set of plates 204 together. In some embodiments, the first set of fasteners 208 may extend through metal plies 102 within the first hybrid metal composite structure 100*a*. In one more embodiments, sides of the first set of plates 204 may be at least substantially aligned with a lateral edge (e.g., interface edge) of the first hybrid metal composite structure 100*a*. In other words, the sides of the first set of plates 204 may not overhang past a body of the first hybrid metal composite structure 100*a*. Furthermore, the first set of plates 204 may be sized and shaped to lie at least substantially flush against the opposing sides of the first hybrid metal composite structure 100*a*.

The second set of plates 206 may be disposed on opposing sides (e.g., upper and lower sides as depicted in FIG. 2) of the second hybrid metal composite structure 100*b*, and the second set of fasteners 210 may connect the second set of plates 206 by extending through the second hybrid metal composite structure 100*b* (e.g., through bearing holes 211 in the second hybrid metal composite structure 100*b*). For instance, the second set of fasteners 210 may couple the second set of plates 206 together. In some embodiments, the second set of fasteners 210 may extend through metal plies 102 within the second hybrid metal composite structure 100*b*. Although FIG. 2 depicts only two fasteners for each set of the first and second sets of fasteners 208, 210, the disclosure is not so limited. Rather, the first and second sets of fasteners 208, 210 may include any number of fasteners. For instance, the first and second sets of fasteners 208, 210 may include additional fasteners in portions of the first and second sets of plates 204, 206 extending inward and outward of the view depicted in FIG. 2. In one more embodiments, one side of each plate of the second set of plates 206 may be at least substantially aligned with a lateral edge (e.g., interface edge) of the second hybrid metal composite structure 100*b*. In other words, the sides of the second set of plates 206 may not overhang past a body of the second hybrid metal composite structure 100*b*. Furthermore, the second set of plates 206 may be sized and shaped to lie at least substantially flush against opposing sides of the second hybrid metal composite structure 100*b*.

In some embodiments, the first and second sets of fasteners 208, 210 may include bolts, rods, studs, pins, etc. In one or more embodiments, the first and second sets of fasteners 208, 210 may also include one or more retaining members (e.g., threaded nuts, washers, etc.). The first and second set of plates 204, 206 may include metal materials, metal alloy materials, composite structure materials, polymer materials, etc. Furthermore, the first and second set of plates 204, 206 may have any geometric shape, such as, for example, a rectangular shape, a circular shape, a triangular shape, etc. Moreover, the first and second set of plates 204, 206 are not limited to planar structures. Rather, in some embodiments, the first and second set of plates 204, 206 may include rings (e.g., annular-shaped structures).

The first and second connector structures 212, 214 may be disposed on opposite sides (e.g., upper and lower sides as depicted in FIG. 2) of the first and second hybrid metal composite structures 100*a*, 100*b* and on outer surfaces (e.g., surface opposite the first and second hybrid metal composite structures 100*a*, 100*b*) of the first and second set of plates 204, 206. In other words, the first and second connector structures 212, 214 may be disposed on the outside of the first and second set of plates 204, 206. Furthermore, the first and second connector structures 212, 214 may extend between the first and second hybrid metal composite structures 100*a*, 100*b*, connecting the first hybrid metal composite structure 100*a* to the second hybrid metal composite structure 100*b* and forming the joint structure 202. The first and second connector structures 212, 214 may be sized and shaped to lie at least substantially flush against the outer surfaces of the first and second set of plates 204, 206. The first and second principal fasteners 216, 218 may extend through the first connector structure 212, through the first and second hybrid metal composite structures 100*a*, 100*b*, and at least partially through the second connector structure 214. For example, the first and second principal fasteners 216, 218 may float (e.g., free to rotate) within the first connector structure 212 and may be coupled to (e.g., threaded within) the second connector structure 214. As a result, the first and second principal fasteners 216, 218 may connect and couple the first connector structure 212 to the second connector structure 214.

In some embodiments, the first and second connector structures 212, 214 may each individually include a plate or a ring or any other structure shaped to match a shape of the first and second hybrid metal composite structures 100*a*, 100*b*. For instance, if the first and second hybrid metal composite structures 100*a*, 100*b* have relatively flat overall shapes, the first and second connector structures 212, 214 may each individually include a plate. Alternatively, if the first and second hybrid metal composite structures 100*a*, 100*b* have cylindrical shapes, the first and second connector structures 212, 214 may each individually include a ring. Moreover, if the first and second hybrid metal composite structures 100*a*, 100*b* have sinusoidal shapes, the first and second connector structures 212, 214 may have correlating sinusoidal shapes. Furthermore, in some embodiments, each of the first and second connector structures 212, 214 may have an at least substantially uniform thickness throughout lateral widths of the first and second connector structures 212, 214. Additionally, the first and second connector structures 212, 214 may include metal materials, metal alloy materials, composite structure materials, polymer materials, etc.

In one or more embodiments, the first and second principal fasteners 216, 218 may include one or more of bolts, rods, studs, pins, etc. For example, one or more of the first and second principal fasteners 216, 218 may include floating pins. A bearing strength of the joint structure 202 may be increased due to the metal plies 102 within the first and second hybrid metal composite structures 100*a*, 100*b*. For instance, the first and second hybrid metal composite structures 100*a*, 100*b* may include the metal plies 102 within portions of the first and second hybrid metal composite structures 100*a*, 100*b* through which the first and second sets of fasteners 208, 210 and first and second principal fasteners 216, 218 extend (i.e., at lateral ends of the first and second hybrid metal composite structures 100*a*, 100*b*). As a result, the metal plies 102 within the first and second hybrid metal composite structures 100a, 100b may increase the bearing strength between each of the first and second hybrid metal composite structures 100a, 100b and the first and second sets of fasteners 208, 210 and first and second principal fasteners 216, 218.

Referring still to FIG. 2, the assembly of the first and second set of plates 204, 206 and the first and second sets of fasteners 208, 210 (referred to herein collectively as "plate assembly") may apply clamping forces (e.g., bolt clamping forces and/or axial clamping forces along longitudinal axes of the first and second sets of fasteners 208, 210) to the first and second hybrid metal composite structures 100a, 100b. In some embodiments, the plate assembly may apply a clamping force sufficient to reduce any gaps between metal plies 102 and/or layers 106 within the first and second hybrid metal composite structures 100a, 100b and gaps between the first and second set of plates 204, 206 and the first and second hybrid metal composite structures 100a, 100b to less than about 0.01 inch. As used herein, the term "gaps" may refer to spaces between metal plies 102 and/or layers 106 within the first and second hybrid metal composite structures 100a, 100b and/or spaces between the first and second hybrid metal composite structures 100a, 100b and other structures (e.g., the plate assembly and/or first and second connector structures) in a direction parallel to directions in which the fasteners (e.g., principal fasteners) extend (e.g., in a direction orthogonal to outer upper surfaces of the first and second hybrid metal composite structures 100a, 100b). In further embodiments, the plate assembly may apply a clamping force sufficient to reduce any gaps to less than about 0.005 inch. In further embodiments, the plate assembly may apply a clamping force sufficient to reduce any gaps to less than about 0.0025 inch. In some embodiments, the plate assembly may apply a clamping force sufficient to at least substantially eliminate any gaps. Additionally, the plate assembly may apply a clamping force to maintain the first and second hybrid metal composite structures 100a, 100b in compression (e.g., compaction).

In one or more embodiments, the plate assembly may be configured to apply a clamping force sufficient to reduce any gaps to less than about a half of a thickness of a given metal ply 102 of the first and second hybrid metal composite structures 100a, 100b. In further embodiments, the plate assembly may apply a clamping force sufficient to reduce any gaps to less than about a quarter (e.g., a fourth) of a thickness of a given metal ply 102 of the first and second hybrid metal composite structures 100a, 100b. In further embodiments, the plate assembly may apply a clamping force sufficient to reduce any gaps to less than about an eighth of a thickness of a given metal ply 102 of the first and second hybrid metal composite structures 100a, 100b. As noted above, in some embodiments, the plate assembly may apply a clamping force sufficient to at least substantially eliminate any gaps.

In continued reference to FIG. 2, in some embodiments, a combination of the plate assembly and the assembly of the first and second connector structures 212, 214 and first and second principal fasteners 216, 218 (referred to herein collectively as "connector assembly") may be configured to apply a clamping force (e.g., an axial clamping force along longitudinal axes of the first and second sets of fasteners 208, 210 and the first and second principal fasteners 216, 218) sufficient to reduce any gaps to less than any of the above-described amounts. For example, in use and operation, the first and second sets of fasteners 208, 210, the first principal fastener 216, and the second principal fastener 218 may be tightened (e.g., torqued) until any gaps are less than any of the above-described amounts. For instance, the plate assembly and the connector assembly may be utilized together (e.g., in conjunction) to reduce any gaps to less than any of the above-described amounts.

Reducing and/or eliminating gaps between metal plies 102 and/or layers 106 within the first and second hybrid metal composite structures 100a, 100b, gaps between the first and second hybrid metal composite structures 100a, 100b and the first and second sets of plates 204, 206, and/or gaps between the first and second sets of plates 204, 206 and the first and second connector structures 212, 214 may increase a bearing strength of the joint structure 202. Increasing a bearing strength of the joint structure 202 may enable the first and second hybrid metal composite structures 100a, 100b and the joint structure 202 to be subjected to greater loads. As a result of the foregoing, structures (e.g., rocket motors, casings, etc.) formed from the hybrid metal composite structures and joint structures of the present disclosure may exhibit higher reliabilities, increased breadth of utilities, increased performance, etc. Additionally, reducing and/or eliminating the gaps may reduce a probability of delamination between (e.g., separation) different layers 106 of the layers 106 of the first and second hybrid metal composite structures 100a, 100b. The foregoing is particularly advantageous for hybrid metal composite structures where adhesion between dissimilar materials is relatively difficult to achieve.

Figure 3:
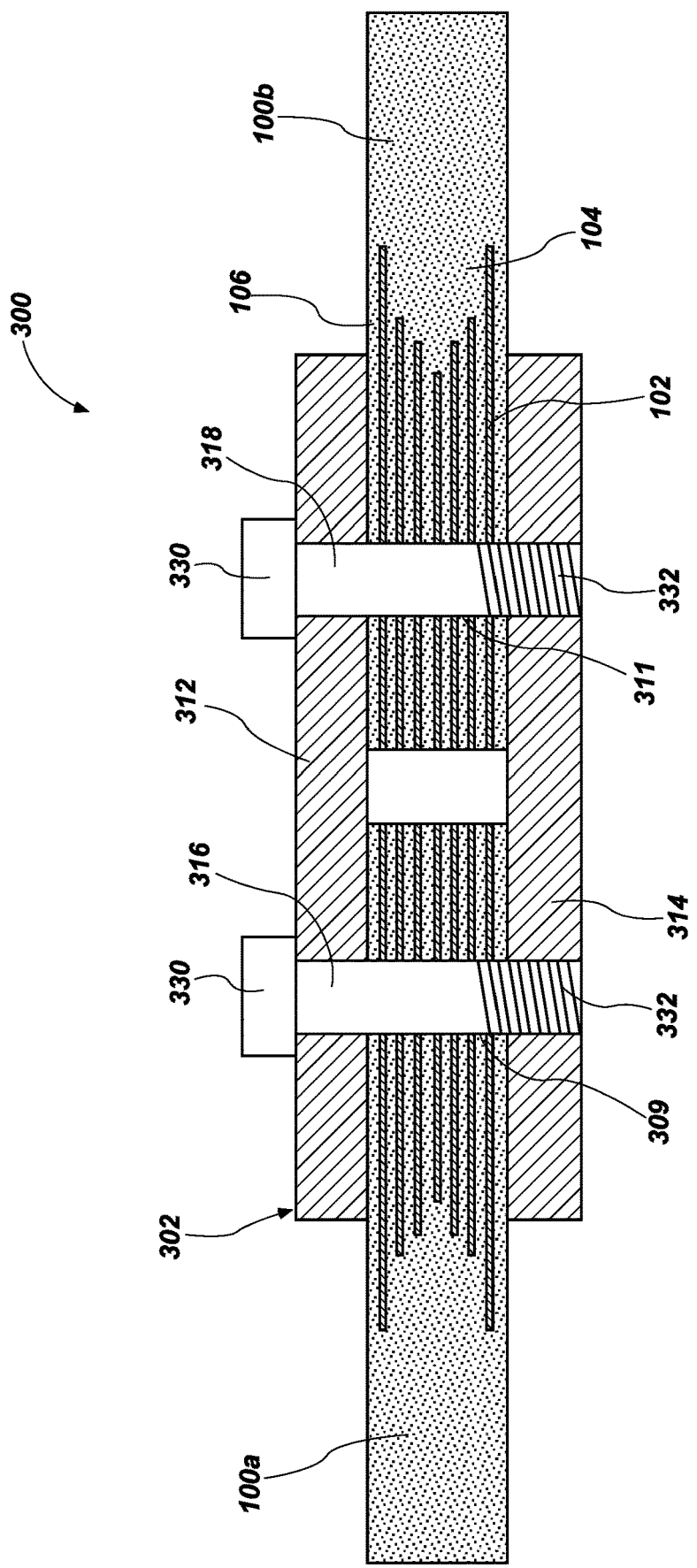
FIG. 3 is a simplified cross-sectional view of another multi-component structure including at least one hybrid metal composite structure and joint structure according to one or more embodiments of the present disclosure.

FIG. 3 is a cross-sectional view of an assembled, multi-component structure 300 including two hybrid metal composite structures 100a, 100b operably coupled together with a joint structure 302 according to additional embodiments of the present disclosure. The two hybrid metal composite structures 100a, 100b may include any of the composite structures described above in regard to FIG. 1 and may include any of the above-described fiber composite material structures 104 and metal plies 102. The joint structure 302 may be similar to the joint structure 202 described in relation to FIG. 2 and may include a first connector structure 312, a second connector structure 314, a first principal fastener 316, and a second principal fastener 318.

The first and second connector structures 312, 314 may be disposed on opposing sides (e.g., upper and lower sides as depicted in FIG. 3) of the first and second hybrid metal composite structures 100a, 100b and on opposing outer surfaces of the first and second hybrid metal composite structures 100a, 100b. For instance, the first and second connector structures 312, 314 may be in direct contact with the first and second hybrid metal composite structures 100a, 100b. For instance, the joint structure 302 may not include any additional plate assembly as described above in regard to FIG. 2. Furthermore, the first and second connector structures 312, 314 may extend between the first and second hybrid metal composite structures 100a, 100b, connecting the first hybrid metal composite structure 100a to the second hybrid metal composite structure 100b and forming the joint structure 302. The first and second connector structures 312, 314 may be sized and shaped to lie at least substantially flush against the outer surfaces of the first and second hybrid metal composite structures 100a, 100b. The first and second principal fasteners 316, 318 may extend through the first connector structure 312, through the first and second hybrid metal composite structures 100a, 100b, and at least partially through the second connector structure 314. For example, the first and second principal fasteners 316, 318 may "float" within the first connector structure 312 (e.g., an outer ring) and may be coupled to (e.g., threaded within) the second connector structure 314 (e.g., an inner ring) or vice versa. As a result, the first and second principal fasteners 316, 318 may connect and couple the first connector structure 312 to the second connector structure 314. In some embodiments, the second connector structure 314 (e.g., an inner ring) (or the first connector structure 312) may be tapped for blind holes (e.g., a hole that can be completely engaged with a correlating fastener from one side of the hybrid metal composite structures, as will be understood in the art). In additional embodiments, the first and second principal fasteners 316, 318 may be in opposite orientations. For instance, the first principal fastener 316 may float within the first connector structure 312 (e.g., an outer ring) and may be coupled to (e.g., threaded within) the second connector structure 314 (e.g., an inner ring), and the second principal fastener 318 may float within the second connector structure 314 (e.g., an inner ring) and may be coupled to (e.g., threaded within) the first connector structure 312 (e.g., an inner ring).

Similar to the first and second connector structures 212, 214 depicted in FIG. 2, the first and second connector structures 312, 314 may each individually include a plate or a ring or any other shape structure depending on a shape of the first and second hybrid metal composite structures 100a, 100b. Furthermore, in some embodiments, each of the first and second connector structures 312, 314 may have an at least substantially uniform thickness throughout lateral widths of the first and second connector structures 312, 314. The first and second connector structures 312, 314 may include any of the materials described above.

In one or more embodiments, the first and second principal fasteners 316, 318 may include one or more of bolts, rods, studs, pins, etc. For example, one or more of the first and second principal fasteners 316, 318 may include bolts having a head 330 thereof resting on an outer surface of the first connector structure 312. Additionally, one or more of the first and second principal fasteners 316, 318 may have a threaded end 332 opposite the head 330 thereof, and the threaded end 332 may be threaded into the second connector structure 314 (e.g., the blind hole of the second connector structure 314). Because the heads 330 of the first and second principal fasteners 316, 318 rest on an outer surface of the first connector structure 312, and because the threaded ends 332 of the first and second principal fasteners 316, 318 are threaded into the second connector structure 314, the first and second connector structures 312, 314 may experience at least some stress when the joint structure 302 is providing a clamping force. Furthermore, the first and second connector structures 312, 314 and first and second principal fasteners 316, 318 may provide any of the clamping forces (e.g., axial clamping forces along longitudinal axes of the first and second principal fasteners 316, 318) described above in regard to FIG. 2 and may provide any of the advantages described above in regard to FIG. 2.

Figure 4:
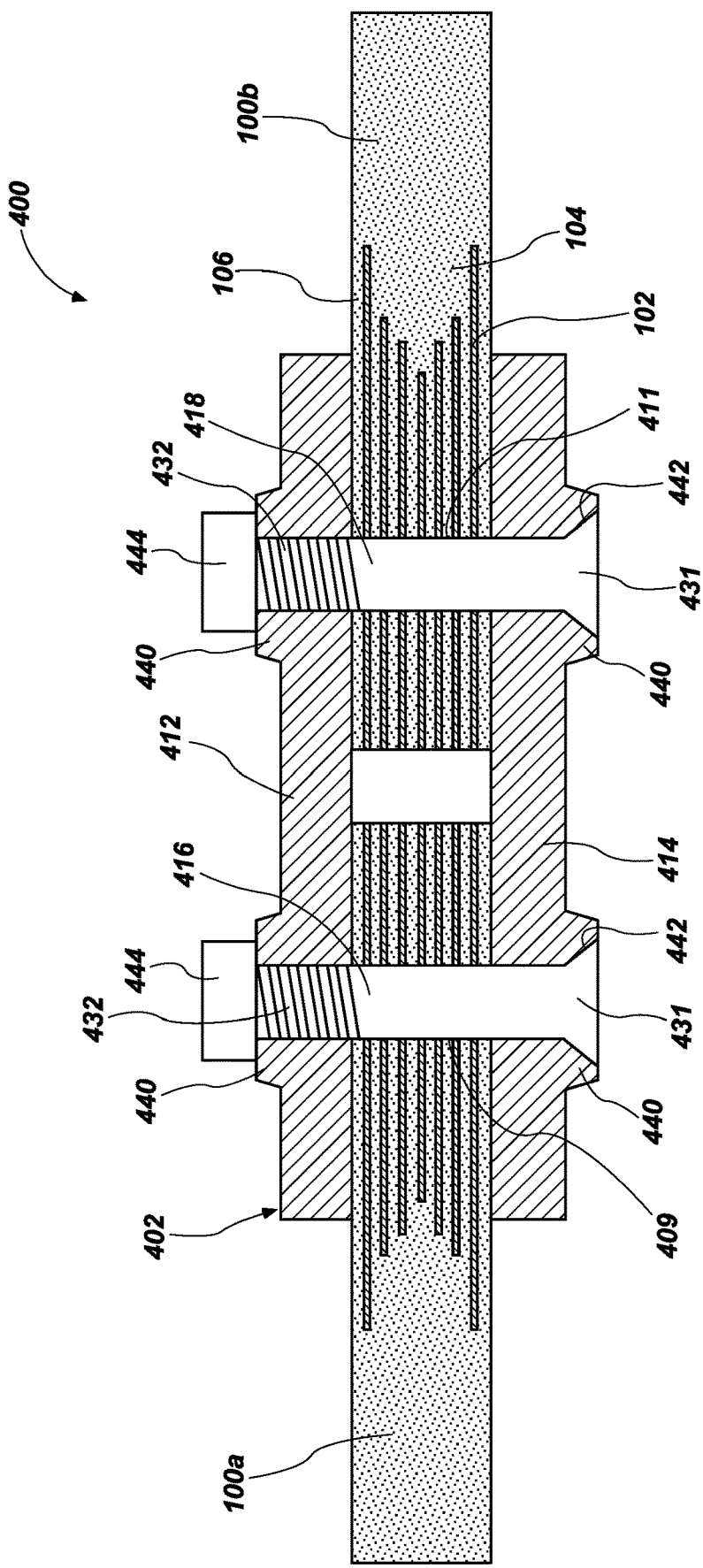
FIG. 4 is a simplified cross-sectional view of another multi-component structure including at least one hybrid metal composite structure and joint structure according to one or more embodiments of the present disclosure.

FIG. 4 is a cross-sectional view of an assembled, multi-component structure 400 including two hybrid metal composite structures 100a, 100b operably coupled together with a joint structure 402 according to additional embodiments of the present disclosure. The two hybrid metal composite structures 100a, 100b may include any of the composite structures described above in regard to FIG. 1 and may include any of the above-described fiber composite material structures 104 and the metal plies 102. The joint structure 402 may be similar to the joint structure 202 described in relation to FIG. 2 and may include a first connector structure 412, a second connector structure 414, a first principal fastener 416, and a second principal fastener 418

The first and second connector structures 412, 414 may be disposed on opposing sides (e.g., upper and lower sides as depicted in FIG. 4) of the first and second hybrid metal composite structures 100a, 100b and on opposing outer surfaces of the first and second hybrid metal composite structures 100a, 100b. For instance, the first and second connector structures 412, 414 may be in direct contact with the first and second hybrid metal composite structures 100a, 100b. For instance, the joint structure 402 may not include any additional plate assembly as described above in regard to FIG. 2. Furthermore, the first and second connector structures 412, 414 may extend between the first and second hybrid metal composite structures 100a, 100b thereby connecting the first hybrid metal composite structure 100a to the second hybrid metal composite structure 100b and forming the joint structure 402. The first and second connector structures 412, 414 may be sized and shaped to lie at least substantially flush against the outer surfaces of the first and second hybrid metal composite structures 100a, 100b. For instance, inner surfaces of the first and second connector structures 412, 414 (e.g., the surfaces of the first and second connector structures 412, 414 facing the first and second hybrid metal composite structures 100a, 100b) may at least substantially match outer surfaces of the first and second hybrid metal composite structures 100a, 100b in shape. The first and second principal fasteners 416, 418 may extend through the first connector structure 412, through the first and second hybrid metal composite structures 100a, 100b, and through the second connector structure 414. As a result, the first and second principal fasteners 416, 418 may connect and couple the first connector structure 412 to the second connector structure 414.

Similar to the first and second connector structures 212, 214 depicted in FIG. 2, the first and second connector structures 412, 414 may each individually include a plate or a ring or any other shape structure depending on a shape of the first and second hybrid metal composite structures 100a, 100b. In some embodiments, each of the first and second connector structures 412, 414 may include a plurality of raised portions 440 (e.g., raised bosses) extending outward relative to the first and second hybrid metal composite structures 100a, 100b (e.g., outward in a direction orthogonal to planes defined by the inner surfaces of the first and second connector structures 412, 414). Furthermore, each raised portion 440 of the plurality of raised portions 440 may correlate to (e.g., may be oriented to receive therethrough) one of the first and second principal fasteners 416, 418. Additionally, for every raised portion 440 formed by the first connector structure 412, the second connector structure 414 may include a correlating raised portion 440. For instance, the first principal fastener 416 may extend through a first raised portion 440 formed by the first connector structure 412 on a first side of the first and second hybrid metal composite structures 100a, 100b, through the first hybrid metal composite structure 100a, and through a correlating second raised portion 440 formed by the second connector structure 414 on an opposite second side of the first and second hybrid metal composite structures 100a, 100b. In one or more embodiments, each of the raised portions 440 may have a general frusto-conical shape. In other embodiments, each of the raised portions 440 may have a cylindrical shape or any other geometric shape. The first and second connector structures 412, 414 may include any of the materials described above.

In one or more embodiments, the first and second principal fasteners 416, 418 may include one or more of bolts, rods, studs, pins, etc. For example, one or more of the first and second principal fasteners 416, 418 may include bolts having countersink heads 431 resting in correlating countersink holes 442 formed in the raised portions 440 of the second connector structure 414 (e.g., inner ring). Additionally, the first and second principal fasteners 416, 418 may have threaded ends 432 opposite the countersink heads 431 thereof, and the threaded ends 432 may extend through the first connector structure 412 and may be threaded into retaining members 444 (e.g., threaded nuts) resting on outer surfaces of the raised portions 440 of the first connector structure 412. The raised portions 440 of the first and second connector structures 412, 414 may assist in the joint structure 402 maintaining clamping forces at the surfaces or at least proximate to the surfaces of the bearing holes 409, 411 extending through the first and second hybrid metal composite structures 100a, 100b. For instance, the first and second connector structures 412, 414 and first and second principal fasteners 416, 418 may provide any of the clamping forces (e.g., axial clamping forces along longitudinal axes of the first and second principal fasteners 416, 418) described above in regard to FIG. 2 and may provide any of the advantages described above in regard to FIG. 2. Additionally, by maintaining clamping forces at surfaces of the bearing holes 409, 411, the joint structure 402 may reduce delamination of the layers 106 and/or metal plies 102 at or proximate to the bearing holes 409, 411 and may increase an overall strength of the multi-component structure 400.

Figure 5:
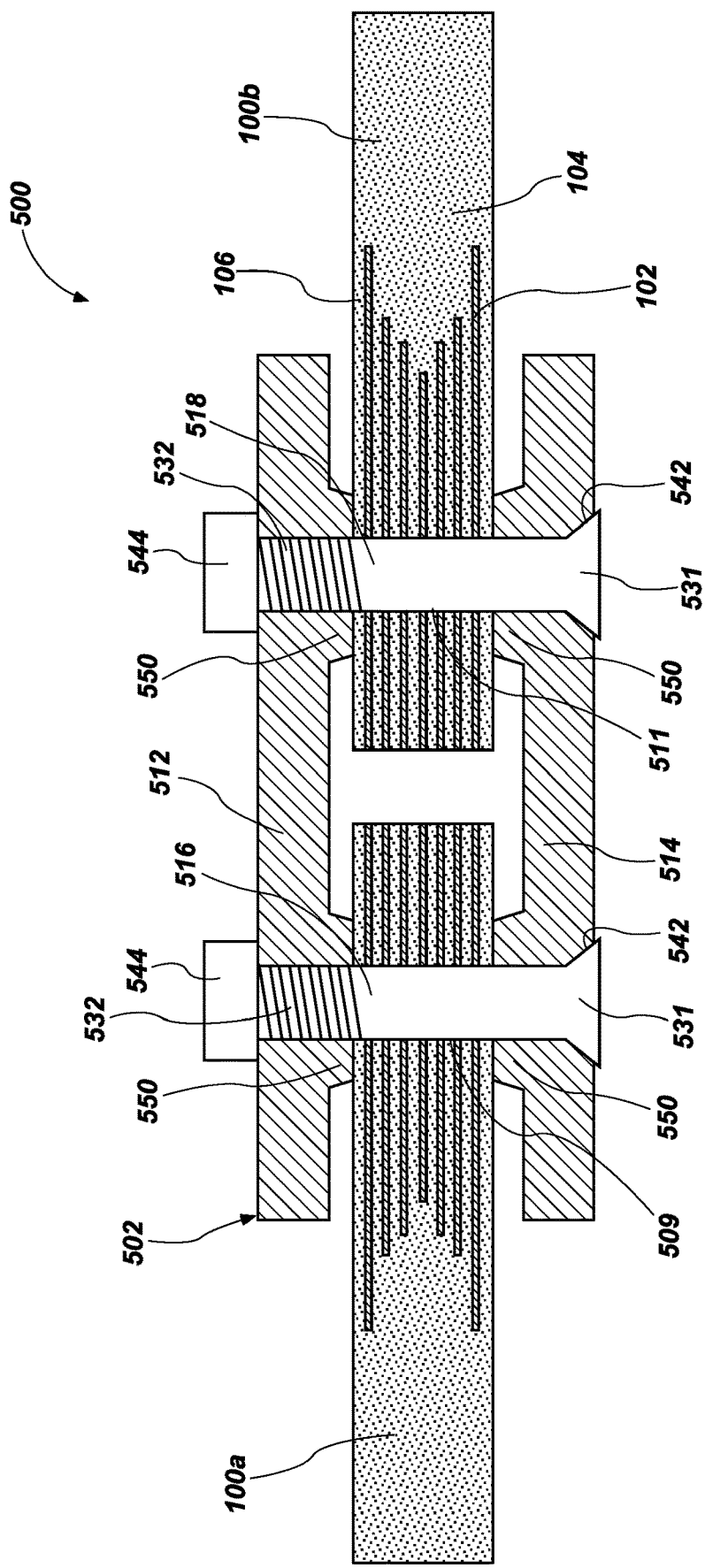
FIG. 5 is a simplified cross-sectional view of another multi-component structure including at least one hybrid metal composite structure and joint structure according to one or more embodiments of the present disclosure.

FIG. 5 is a cross-sectional view of an assembled, multi-component structure 500 including two hybrid metal composite structures 100a, 100b operably coupled together with a joint structure 502 according to additional embodiments of the present disclosure. The two hybrid metal composite structures 100a, 100b may include any of the composite structures described above in regard to FIG. 1 and may include any of the above-described fiber composite material structures 104 and the metal plies 102. The joint structure 502 may be similar to the joint structure 202 described in relation to FIG. 2 and may include a first connector structure 512, a second connector structure 514, a first principal fastener 516, and a second principal fastener 518.

The first and second connector structures 512, 514 may be disposed on opposing sides (e.g., upper and lower sides as depicted in FIG. 5) of the first and second hybrid metal composite structures 100a, 100b and on opposing outer surfaces of the first and second hybrid metal composite structures 100a, 100b. For instance, the first and second connector structures 512, 514 may be in direct contact with the first and second hybrid metal composite structures 100a, 100b. For instance, the joint structure 502 may not include any additional plate assembly as described above in regard to FIG. 2. Furthermore, the first and second connector structures 512, 514 may extend between the first and second hybrid metal composite structures 100a, 100b, connecting the first hybrid metal composite structure 100a to the second hybrid metal composite structure 100b and forming the joint structure 502. The first and second principal fasteners 516, 518 may extend through the first connector structure 512, through the first and second hybrid metal composite structures 100a, 100b, and through the second connector structure 514. As a result, the first and second principal fasteners 516, 518 may connect and couple the first connector structure 512 to the second connector structure 514.

Similar to the first and second connector structures 212, 214 depicted in FIG. 2, the first and second connector structures 512, 514 may each individually include a plate or a ring or any other shape structure depending on a shape of the first and second hybrid metal composite structures 100a, 100b. In some embodiments, each of the first and second connector structures 512, 514 may include a plurality of raised portions 550 (e.g., raised bosses) extending inward from the first and second connector structures 512, 514 toward the first and second hybrid metal composite structures 100a, 100b. For instance, the plurality of raised portions 550 of the first and second connector structures 512, 514 may be the only portions of the first and second connector structures 512, 514 that abut up against the first and second hybrid metal composite structures 100a, 100b in operation. Furthermore, each raised portion 550 of the plurality of raised portions 550 may correlate to (e.g., may be oriented to receive therethrough) one of the first and second principal fasteners 516, 518. Additionally, for every raised portion 550 formed by the first connector structure 512, the second connector structure 514 may include a correlating raised portion 550. For instance, the first principal fastener 516 may extend through a first raised portion 550 formed by the first connector structure 512 on a first side of the first and second hybrid metal composite structures 100a, 100b, through the first hybrid metal composite structure 100a, and through a correlating second raised portion 550 formed by the second connector structure 514 on an opposite second side of the first and second hybrid metal composite structures 100a, 100b. In one or more embodiments, each of the raised portions 550 may have a general frusto-conical shape. In other embodiments, each of the raised portions 550 may have a cylindrical shape or any other geometric shape. The first and second connector structures 512, 514 may include any of the materials described above.

In one or more embodiments, the first and second principal fasteners 516, 518 may include one or more bolts, rods, studs, pins, etc. For example, one or more of the first and second principal fasteners 516, 518 may include bolts having countersink heads 531 resting in correlating countersink holes 542 formed in the second connector structure 514 (e.g., inner ring) (e.g., a side of the second connector structure 514 opposite the raised portions 550 of the second connector structure 514). Additionally, the first and second principal fasteners 516, 518 may have threaded ends 532 opposite the countersink heads 531 thereof, and the threaded ends 532 may extend through the first connector structure 512 and may be threaded into retaining members 544 (e.g., threaded nuts) resting on an outer surface of the first connector structure 512 (e.g., a surface opposite the raised portions 550 of the first connector structure 512). In view of the foregoing, the raised portions 550 of the first and second connector structures 512, 514 may face and rest against the first and second hybrid metal composite structures 100a, 100b during use and operation. The raised portions 550 of the first and second connector structures 512, 514 may assist in the joint structure 502 maintaining clamping forces at or at least proximate to the surfaces of bearing holes 509, 511 extending through the first and second hybrid metal composite structures 100a, 100b. For instance, the first and second connector structures 512, 514 and first and second principal fasteners 516, 518 may provide any of the clamping forces (e.g., axial clamping forces along longitudinal axes of the first and second principal fasteners 516, 518) described above in regard to FIG. 2 and may provide any of the advantages described above in regard to FIG. 2. Additionally, by maintaining clamping forces at surfaces of the bearing holes 509, 511 the joint structure 502 may reduce delamination of the layers and/or metal plies at or proximate to the bearing holes 509, 511 and may increase an overall strength of the multi-component structure 500.

Figure 6:
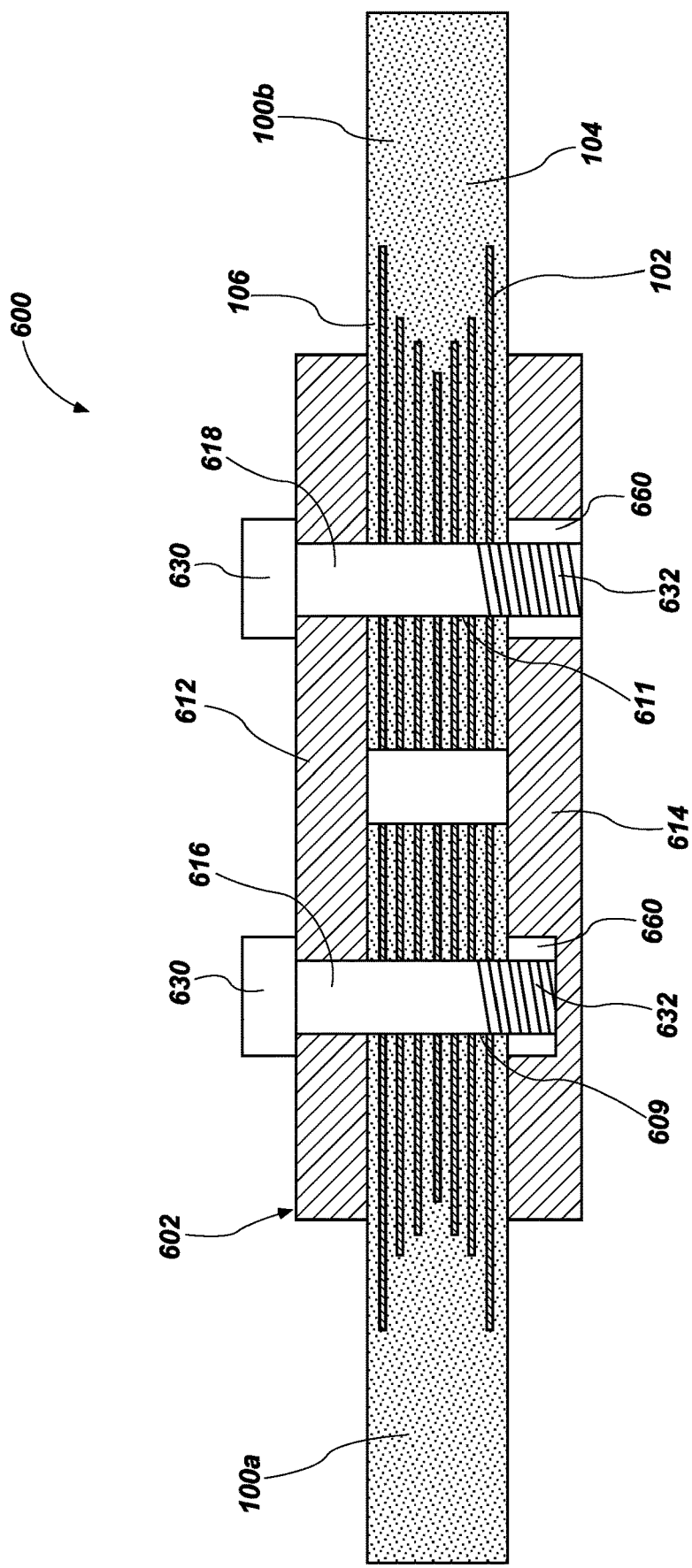
FIG. 6 is a simplified cross-sectional view of another multi-component structure including at least one hybrid metal composite structure and joint structure according to one or more embodiments of the present disclosure.
Figure 7:
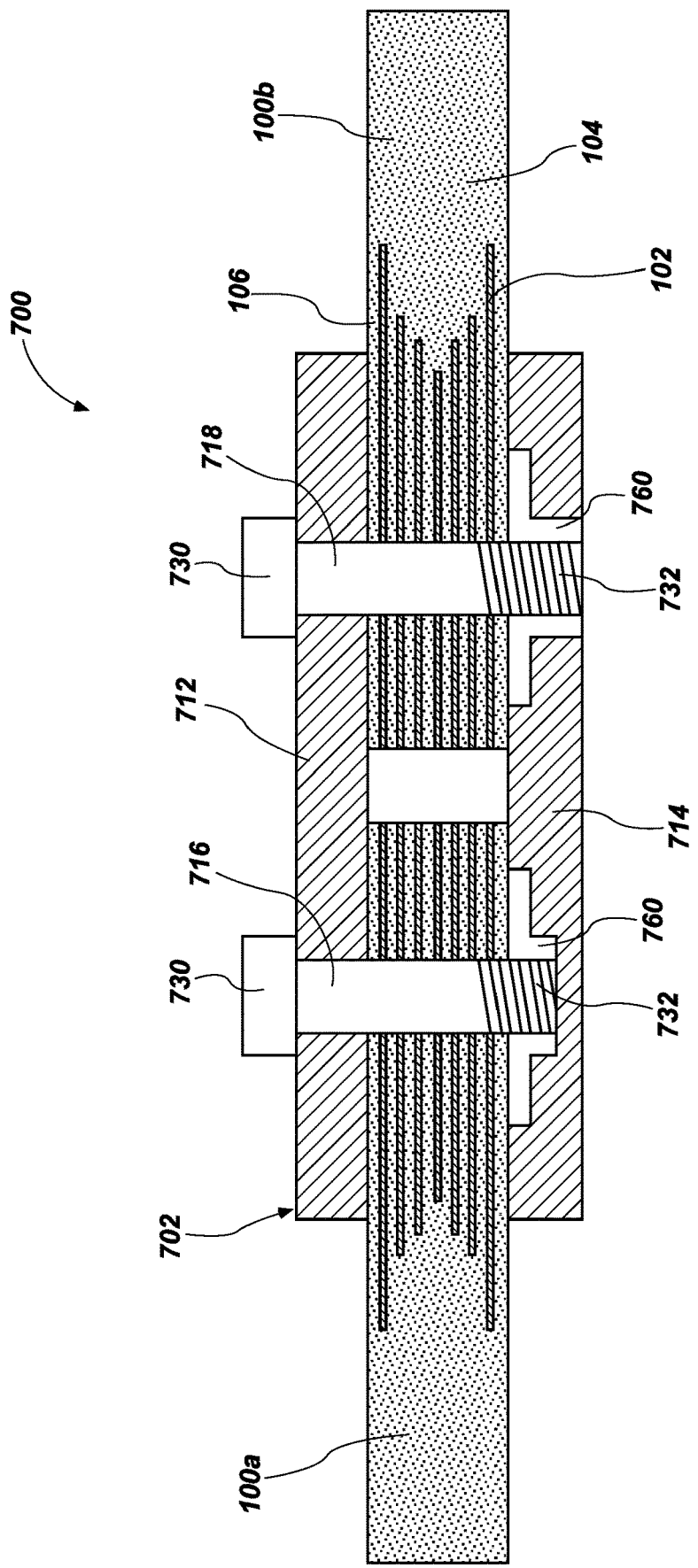
FIG. 7 is a simplified cross-sectional view of another multi-component structure including at least one hybrid metal composite structure and joint structure according to one or more embodiments of the present disclosure.
Figure 8:
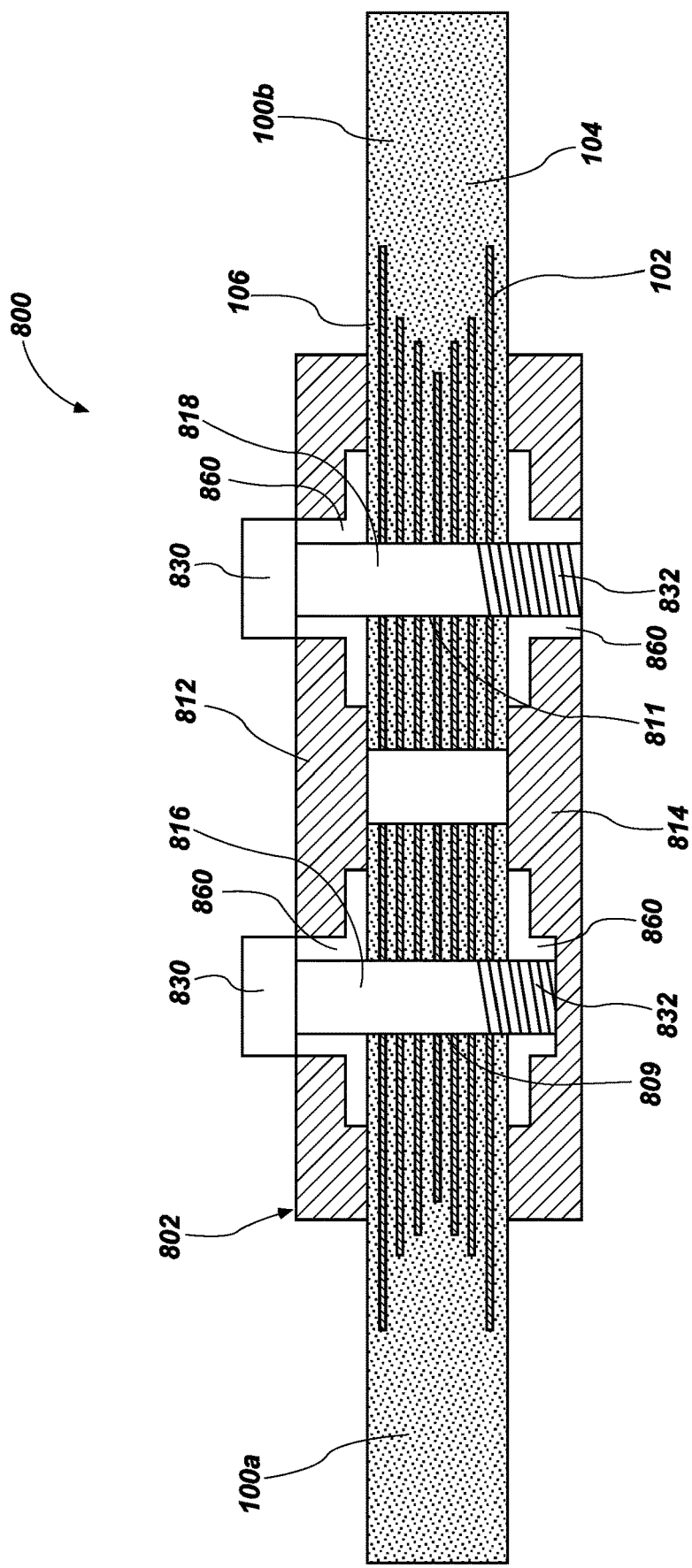
FIG. 8 is a simplified cross-sectional view of another multi-component structure including at least one hybrid metal composite structure and joint structure according to one or more embodiments of the present disclosure.

FIGS. 6-8 show cross-sectional views of assembled, multi-component structures 600, 700, 800 including two hybrid metal composite structures 100a, 100b operably coupled together with joint structures 602, 702, 802 according to additional embodiments of the present disclosure. As shown in FIGS. 6-8, in some embodiments, the first and second principal fasteners (referred to collectively with the numerals 616, 618) may include flanged and/or non-flanged sliding/non-attached nuts 660 disposed on one side of the two hybrid metal composite structures 100a, 100b with heads 630 disposed on the opposite side of the two hybrid metal composite structures 100a, 100b. For example, the sliding/non-attached nuts 660 may not be attached to the connector structure through which the sliding/non-attached nuts 660 extend and/or are disposed within. For instance, the first and second principal fasteners 616, 618 may include sliding/non-attached nuts 660 extending through at least a portion of the second connector structure 614. In one or more embodiments, the sliding/non-attached nuts 660 may extend completely through the connector structure through which the sliding/non-attached nuts 660 extend. In other embodiments, the sliding/non-attached nuts 660 may extend through only a portion of the connector structure through which the sliding/non-attached nuts 660 extend. In some embodiments, the sliding/non-attached nuts 660 may be blind (e.g., a nut that can be completely installed and engaged from one side of the hybrid metal composite structures, as will be understood in the art).

In one or more embodiments, the multi-component structure 800 (as shown in FIG. 8) may include sliding/non-attached nuts 860 and/or washers on both sides of the hybrid metal composite structures 100a, 100b. Furthermore, when the multi-component structure 800 includes flanged nuts 760, 860 (as depicted in FIGS. 7 and 8), the flanges of the flanged nuts 860 may abut up against the hybrid metal composite structures 100a, 100b. Additionally, in some embodiments, each of the first and second principal fasteners 616, 618 may include the same types of flanged and/or non-flanged sliding/non-attached nuts 660. In other embodiments, each of the first and second principal fasteners 616, 618 may include the differing types of flanged and/or non-flanged sliding/non-attached nuts 660, as shown in FIG. 6.

Utilizing sliding/non-attached nuts 660 with the first and second principal fasteners 616, 618 may enable any of the clamping forces described above to be exerted on the hybrid metal composite structures 100a, 100b without causing additional stress in one or more of the connector structures (e.g., inner and outer rings). Additionally, the flanged sliding/non-attached nuts 760, 860 (shown in FIGS. 7 and 8) provide for higher surface area compaction (e.g., compaction forces applied over a greater surface area) in comparison to the non-flanged sliding/non-attached nuts 660 (shown in FIG. 6). In some embodiments, when utilizing the flanged sliding/non-attached nuts, the first and second connector structures are held in place via mechanical interference with the flanged sliding/non-attached nuts.

Figure 9C:
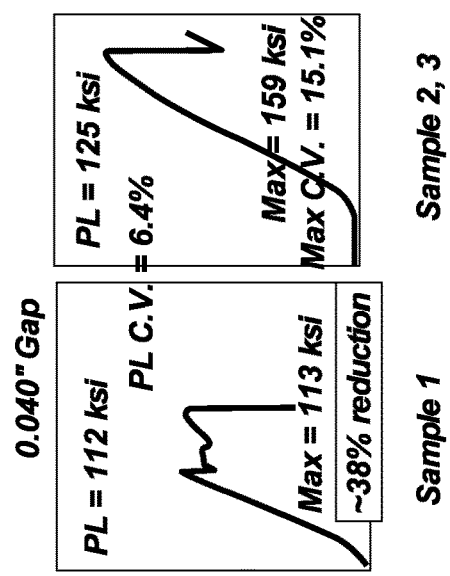
FIGS. 9A-9C show comparisons of pin-bearing strengths of multi-component structures during tests performed by the inventors according to one or more embodiments of the present disclosure.
Figure 9B:
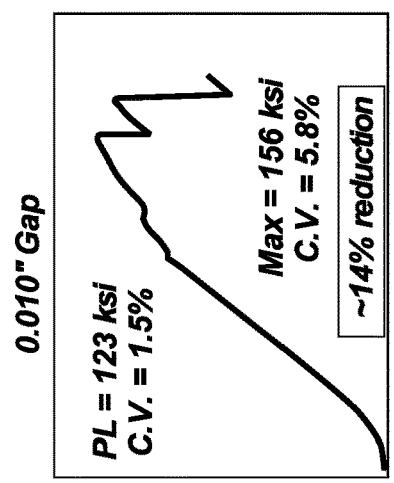
Figure 9A:
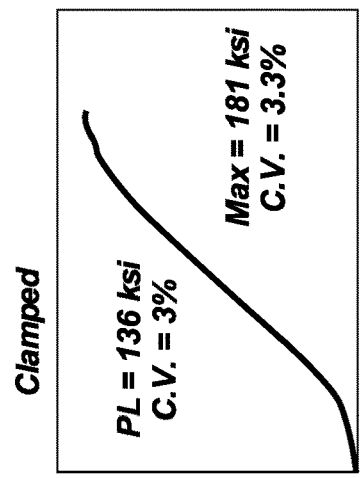

FIGS. 9A-9C show comparisons of pin-bearing strengths of multi-component structures exhibited during tests performed by the inventors. As shown, in FIG. 9A, a clamped multi-component structure (e.g., a multi-component structure including a joint structure of the present disclosure) and having gaps of less than 0.010 inch between plies, layers, and/or the hybrid metal composite structures and a joint structure exhibited a max bearing stress of 181 kilo pounds per square inch ("ksi") and a coefficient of variation ("CV") of 3.3% at the max bearing stress. Additionally, the clamped multi-component structure exhibited a proportional limit ("PL") of 136 ksi and a CV of 3.0% at the PL. As will be understood by one of ordinary skill in the art, proportionality is only maintained in a linear portion of the curve depicted in FIGS. 9A-9C. Additionally, as shown in FIG. 9B, a multi-component structure having 0.010 inch gaps between plies, layers, and/or the hybrid metal composite structures and a joint structure exhibited a max bearing stress of 156 ksi and a CV of 5.8% at the max bearing stress. Moreover, the multi-component structure having 0.010 inch gaps exhibited a PL of 123 ksi and a CV of 1.5% at the PL. Therefore, the multi-component structure having 0.010 inch gaps exhibited a reduction in bearing strength by about 14% in comparison to the clamped multi-component structure. Furthermore, as shown in FIG. 9C, a multi-component structure having 0.040 inch gaps between plies, layers, and/or the hybrid metal composite structures and a joint structure exhibited an average max bearing stress of 136 ksi and a CV of 15.1% at the max bearing stress. Additionally, the multi-component structure having 0.040 inch gaps exhibited an average PL of 119 ksi and a CV of 6.4% at the PL. Therefore, the multi-component structure having 0.040 inch gaps exhibited a reduction in bearing strength by about 38% in comparison to the clamped multi-component structure.

Furthermore, during tests performed by the inventors, multi-component structures including joint structures of the present disclosure and having gaps of less than 0.010 exhibited an increase in mechanical strength of about 20%, an increase in PL of about 18%, and an increase in ultimate capacity of about 16%.

Figure 10:
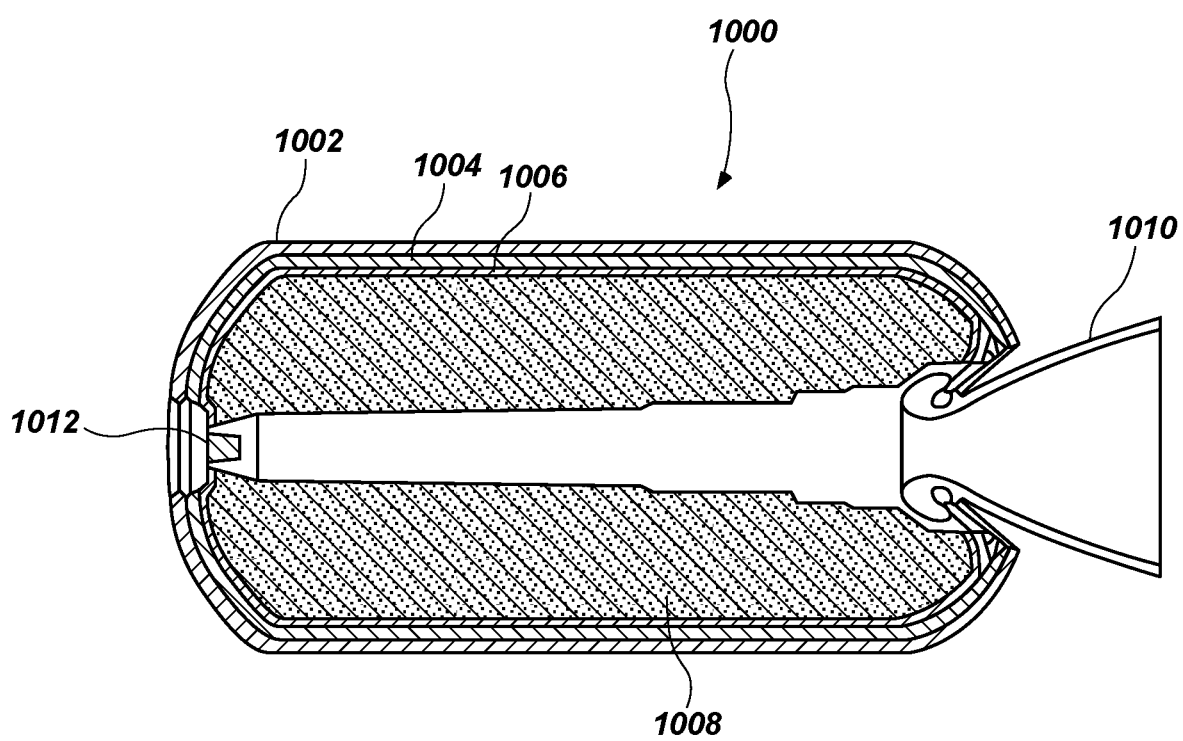
FIG. 10 is a simplified cross-sectional view of a rocket motor including one or more hybrid metal composite structures, according to an embodiment of the disclosure.

FIG. 10 is a simplified cross-sectional view of a rocket motor 1000 including one or more hybrid metal composite structures, according to an embodiment of the disclosure. The rocket motor 1000 may, for example, be configured to be a component (e.g., a stage) of a larger assembly (e.g., a multi-stage rocket motor assembly). The rocket motor 1000 may include an assembly comprising a casing 1002, an insulation material 1004, a liner 1006, and a propellant structure 1008 (e.g., a solid propellant such as a double-base propellant, an HTPB-based propellant, etc.). During operation, the insulation material 1004 may protect the rocket motor casing 1002 from thermal and erosive effects of particle streams generated from combustion of the propellant structure 1008. The insulation material 1004 may further be disposed on surfaces of a nozzle assembly 1010 to protect the nozzle assembly 1010 from hot exhaust gases. The liner 1006 bonds the insulation material 1004 to the propellant structure 1008. The rocket motor 1000 may further include an igniter 1012 that may be activated to ignite the propellant structure 1008.

The casing 1002 may include a metal, a composite material, or a combination of metal and composite materials. In some embodiments, the casing 1002 includes one or more hybrid metal composite structures 100, multi-component structures, and/or joint structures (FIGS. 1-8) according to embodiments of the disclosure. For example, adjacent portions of the casing 1002 may comprise hybrid metal composite structures 100 operably coupled together as described above with references to FIGS. 2-8. Forming the casing 1002 from a plurality of coupled hybrid metal composite structures may permit at least some of the coupled hybrid metal composite structures to be reused following the use of the rocket motor 1000.

The propellant structure 1008 may be formed of and include at least one propellant material, such as at least one solid propellant. Various examples of suitable solid propellants and components thereof are described in Thakre et al., Solid Propellants, Rocket Propulsion, Vol. 2, Encyclopedia of Aerospace Engineering, John Wiley & Sons, Ltd. 2010, the disclosure of which document is hereby incorporated herein in its entirety by this reference. The solid propellant may be a class 4.1, 1.4, or 1.3 material, as defined by the United States Department of Transportation shipping classification, so that transportation restrictions are minimized. By way of non-limiting example, the propellant of the propellant structure 1008 may be formed of and include a polymer having one or more of a fuel and an oxidizer incorporated therein. The polymer may be an energetic polymer or a non-energetic polymer, such as glycidyl nitrate (GLYN), nitratomethylmethyloxetane (NMMO), glycidyl azide (GAP), diethyleneglycol triethyleneglycol nitraminodiacetic acid terpolymer (9DT-NIDA), bis(azidomethyl)-oxetane (BAMO), azidomethylmethyl-oxetane (AMMO), nitraminomethyl methyloxetane (NAMMO), bis(difluoroaminomethyl)oxetane (BFMO), difluoroaminomethylmethyloxetane (DFMO), copolymers thereof, cellulose acetate, cellulose acetate butyrate (CAB), nitrocellulose, polyamide (nylon), polyester, polyethylene, polypropylene, polystyrene, polycarbonate, a polyacrylate, a wax, a hydroxyl-terminated polybutadiene (HTPB), a hydroxyl-terminated poly-ether (HTPE), carboxyl-terminated polybutadiene (CTPB) and carboxyl-terminated polyether (CTPE), diaminoazoxy furazan (DAAF), 2,6-bis(picrylamino)-3,5-dinitropyridine (PYX), a polybutadiene acrylonitrile/acrylic acid copolymer binder (PBAN), polyvinyl chloride (PVC), ethylmethacrylate, acrylonitrile-butadiene-styrene (ABS), a fluoropolymer, polyvinyl alcohol (PVA), or combinations thereof. The polymer may function as a binder, within which the one or more of the fuel and oxidizer is dispersed. The fuel may be a metal, such as aluminum, nickel, magnesium, silicon, boron, beryllium, zirconium, hafnium, zinc, tungsten, molybdenum, copper, or titanium, or alloys mixtures or compounds thereof, such as aluminum hydride ($AlH_3$), magnesium hydride ($MgH_2$), or borane compounds ($BH_3$). The metal may be used in powder form. The oxidizer may be an inorganic perchlorate, such as ammonium perchlorate or potassium perchlorate, or an inorganic nitrate, such as ammonium nitrate or potassium nitrate. Other oxidizers may also be used, such as hydroxylammonium nitrate (HAN), ammonium dinitramide (ADN), hydrazinium nitroformate, a nitramine, such as cyclotetramethylene tetranitramine (HMX), cyclotrimethylene trinitramine (RDX), 2,4,6,8,10,12-hexanitro-2,4,6,8,10,12-hexaazaisowurtzitane (CL-20 or BMW), and/or 4,10-dinitro-2,6,8,12-tetraoxa-4,10-diazatetracyclo-[$5.5.0.0^{5,9}.0^{3,11}$]-dodecane (TEX). In addition, the propellant of the propellant structure 1008 may include additional components, such as one or more of a plasticizer, a bonding agent, a combustion rate modifier, a ballistic modifier, a cure catalyst, an antioxidant, and a pot life extender, depending on the desired properties of the propellant. These additional components are well known in the rocket motor art and, therefore, are not described in detail herein. The components of the propellant of the propellant structure 1008 may be combined by conventional techniques, which are not described in detail herein.

With continued reference to FIG. 10, nozzle assembly 1010 may be cooperatively associated with the casing 1002 and the propellant structure 1008 so as to produce a desired thrust during use and operation. The nozzle assembly 1010 may be stationary (e.g., fixed), or may be adjustable to selectively alter the course of flight of the rocket motor 1000 (and, hence, of a launch vehicle including the rocket motor 1000). In some embodiments, the nozzle assembly 1010 includes a thrust nozzle, a flexible bearing assembly connected to the thrust nozzle and the casing 1002, and at least one actuator connected to the thrust nozzle. Lateral movement of the flexible bearing assembly by way of the actuator may be used to modify the position of the thrust nozzle so as to control the direction of the rocket motor 1000 (and, hence, of a launch vehicle including the rocket motor 1000) during use and operation (e.g., flight) thereof. Suitable configurations (e.g., components, component shapes, component sizes, component materials, component arrangements, etc.) for the nozzle assembly 1010 are well known in the rocket motor art and, therefore, are not described in detail herein.

Figure 11:
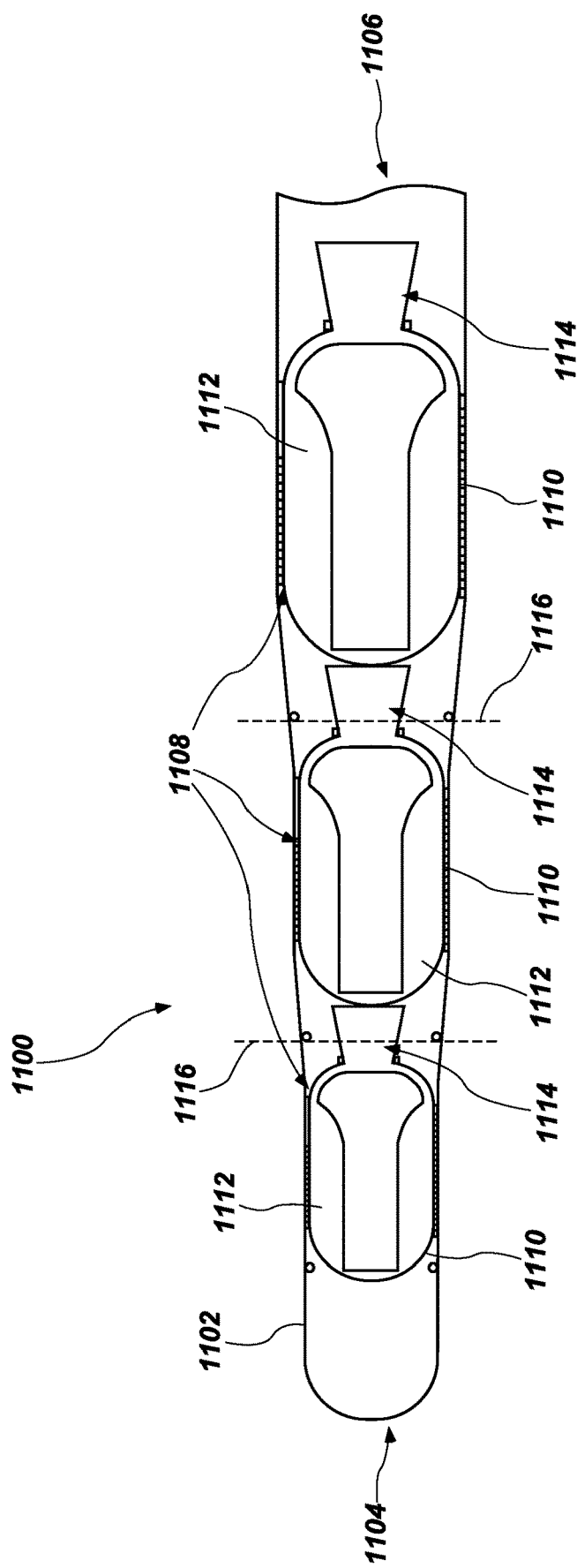
FIG. 11 is a simplified cross-sectional view of a multi-stage rocket motor assembly including one or more hybrid metal composite structures, according to an embodiment of the disclosure.

FIG. 11 is a cross-sectional view of a multi-stage rocket motor assembly 1100, in accordance with embodiments of the disclosure. The multi-stage rocket motor assembly 1100 may include an outer housing 1102 having a closed forward end 1104 and an open aft end 1106. The outer housing 1102 may formed of and include one or more hybrid metal composite structures, such as one or more of the hybrid metal composite structures 100 previously described with respect to FIGS. 1-8. For example, the outer housing 1102 may be formed of and include at least two (2) hybrid metal composite structures coupled (e.g., connected) to one another in a manner substantially similar to that previously described with reference to FIGS. 2-8 for connecting the first hybrid metal composite structure 100a to the second hybrid metal composite structure 100b. The multi-stage rocket motor assembly 1100 may also include plurality of stages 1108 provided in an end-to-end relationship with one another within the outer housing 1102. For example, as shown in FIG. 11, the multi-stage rocket motor assembly 1100 may include three (3) stages 1108 each contained within the outer housing 1102. In additional embodiments, the multi-stage rocket motor assembly 1100 may include a different number of stages 1108, such as from one (1) stage to ten (10) stages. The stages 1108 may include casings 1110, propellant structures 1112 with the casings 1110, and nozzle assemblies 1114 physically connected to aft ends of the casings 1110. One or more of the stages 1108 may be substantially similar to the rocket motor 1000 previously described with reference to FIG. 10. The outer housing 1102 may be configured to be severable at locations 1116, as indicated by dashed lines, associated with the stages 1108 during use and operation of the multi-stage rocket motor assembly 1100 (e.g., following combustion of the propellant structure 1112 within a given one of the stages 1108).

The hybrid metal composite structures (e.g., the hybrid metal composite structure 100 shown in FIG. 1) of the disclosure may exhibit improved properties as compared to conventional fiber composite material structures. For example, the hybrid metal composite structures including the metal plies 102 (FIG. 1) of the disclosure may exhibit enhanced strength, enhanced structural integrity, and reduced weight as compared to conventional fiber composite material structures. The metal plies may, for example, increase the bearing strength of the hybrid metal composite structures when the hybrid metal composite structures are coupled (e.g., by way of fixture assembly, such as a bolted fixture) to one or more other structures. In turn, multi-component structures (e.g., the multi-component structures shown in FIGS. 2-8), rocket motors (e.g., the rocket motor 1000 shown in FIG. 10), and rocket motor assemblies (e.g., the multi-stage rocket motor assembly 1100 shown in FIG. 11) including the hybrid metal composite structures may exhibit improved performance, increased efficiency, increased reliability, reduced costs (e.g., material costs, equipment costs, etc.), reduced weight, increased simplicity, and/or increased safety as compared to many conventional multi-component structures, rocket motors, and multi-stage rocket motor assemblies not including the hybrid metal composite structures.

Although the hybrid metal composite structure 100 (FIG. 1) has been described as being useful in adjoining case segments of a rocket case, the disclosure is not so limited. The hybrid metal composite structure 100 may be used in applications utilizing fiber composite materials or applications requiring a low weight and exhibiting improved bearing strength. The hybrid metal composite structure 100 described herein facilitates use of fiber composite structures in aerospace and other applications where low bearing strength without excessive weight is conventionally a limiting factor.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of the disclosure.

What is claimed is:

1. A multi-component structure, comprising:
   a first hybrid metal composite structure and a second hybrid metal composite structure, each of the first and second hybrid metal composite structures comprising:
      layers comprising a fiber composite material structure; and
      at least one metal ply located between the layers; and
   a joint structure extending between and connecting the first hybrid metal composite structure and the second hybrid metal composite structure, the joint structure comprising:
      a first connector structure disposed on a first side of the first hybrid metal composite structure and the second hybrid metal composite structure and extending between the first hybrid metal composite structure and the second hybrid metal composite structure;
      a second connector structure disposed on a second opposite side of the first hybrid metal composite structure and the second hybrid metal composite structure and extending between the first hybrid metal composite structure and the second hybrid metal composite structure;
      a first principal fastener extending from the first connector structure, through the first hybrid metal composite structure, and to the second connector structure; and
      a second principal fastener extending from the first connector structure, through the second hybrid metal composite structure, and to the second connector structure,
      wherein each of the first and second connector structures comprises raised portions for seating the first and second principal fasteners, the raised portions extending outward from the first and second connector structures in a direction parallel to directions in which the first and second principal fasteners extend through the first and second hybrid metal composite structures,
   wherein the joint structure is configured to exert a clamping force on the first and second hybrid metal composite structures to reduce gaps between the layers of the first and second hybrid metal composite structures, between the layers and the at least one metal ply of the first and second hybrid metal composite structures, and between the joint structure and the first and second hybrid metal composite structures to less than half a thickness of the at least one metal ply.

2. The multi-component structure of claim claim 1, wherein the joint structure further comprises:
   a first set of plates disposed on opposite sides of the first hybrid metal composite structure and disposed between the first hybrid metal composite structure and the first and second connector structures;
   a first set of fasteners extending between the first set of plates and through the first hybrid metal composite structure;
   a second set of plates disposed on opposite sides of the second hybrid metal composite structure and disposed between the second hybrid metal composite structure and the first and second connector structures; and
   a second set of fasteners extending between the first set of plates and through the first hybrid metal composite structure.

3. The multi-component structure of claim 1, wherein each of the first and second connector structures comprises a ring.

4. The multi-component structure of claim 1, wherein each of the first and second connector structures comprises a plate.

5. The multi-component structure of claim 1, wherein each of the first and second principal fasteners comprises a floating pin.

6. The multi-component structure of claim 1, wherein the joint structure is configured to exert a clamping force on the first and second hybrid metal composite structures to reduce gaps between the layers of the first and second hybrid metal composite structures, between the layers and the at least one metal ply of the first and second hybrid metal composite structures, and between the joint structure and the first and second hybrid metal composite structures to less than a fourth of a thickness of the at least one metal ply.

7. The multi-component structure of claim 1, wherein the joint structure is configured to exert a clamping force on the first and second hybrid metal composite structures to reduce gaps between the layers of the first and second hybrid metal composite structures, between the layers and the at least one metal ply of the first and second hybrid metal composite structures, and between the joint structure and the first and second hybrid metal composite structures to less than an eighth of a thickness of the at least one metal ply.

8. The joint structure of claim 1, wherein the joint structure is configured to exert a clamping force on the first and second hybrid metal composite structures to reduce gaps between the joint structure and the first and second hybrid metal composite structures to less than 0.005 inch.

9. The joint structure of claim 1, wherein the joint structure is configured to exert a clamping force on the first and second hybrid metal composite structures to reduce gaps between the joint structure and the first and second hybrid metal composite structures to less than 0.0025 inch.

10. The joint structure of claim 1, wherein the joint structure is configured to exert a clamping force on the first and second hybrid metal composite structures to at least substantially eliminate gaps between the joint structure and the first and second hybrid metal composite structures.

11. The joint structure of claim 1, wherein the first principal fastener extends through metal plies within the first hybrid metal composite structure, and wherein the second principal fastener extends through metal plies within the second hybrid metal composite structure.

12. The joint structure of claim 1, wherein at least one of the first and second principal fasteners comprises a bolt comprising a countersink head and a threaded retaining member.

13. A rocket motor, comprising:
a first hybrid metal composite structure and a second hybrid metal composite structure, each of the first and second hybrid metal composite structures comprising:
layers comprising a fiber composite material structure; and
at least one metal ply located between layers of the layers; and
a joint structure extending between and connecting the first hybrid metal composite structure and the second hybrid metal composite structure, the joint structure comprising:
a first connector structure disposed on a first side of the first hybrid metal composite structure and the second hybrid metal composite structure and extending between the first hybrid metal composite structure and the second hybrid metal composite structure;
a second connector structure disposed on a second opposite side of the first hybrid metal composite structure and the second hybrid metal composite structure and extending between the first hybrid metal composite structure and the second hybrid metal composite structure;
a first principal fastener extending from the first connector structure, through the first hybrid metal composite structure, and to the second connector structure; and
a second principal fastener extending from the first connector structure, through the second hybrid metal composite structure, and to the second connector structure,
wherein each of the first and second connector structures comprises raised portions for seating the first and second principal fasteners, the raised portions extending outward from the first and second connector structures in a direction parallel to directions in which the first and second principal fasteners extend through the first and second hybrid metal composite structures; and
wherein the joint structure exerts a clamping force on the first and second hybrid metal composite structures and reducing gaps between the layers of the first and second hybrid metal composite structures, between the layers and the at least one metal ply of the first and second hybrid metal composite structures, and between the joint structure and the first and second hybrid metal composite structures to less than half a thickness of the at least one metal ply.

14. The rocket motor of claim 13, wherein at least one of the first and second principal fasteners comprises a bolt comprising a countersink head and a threaded retaining member.

15. The rocket motor of claim 13, wherein the first principal fastener extends through metal plies within the first hybrid metal composite structure, and wherein the second principal fastener extends through metal plies within the second hybrid metal composite structure.

16. The rocket motor of claim 13, wherein each of the first and second connector structures comprises a ring.

17. A method of forming a multi-component structure, comprising:
forming a first hybrid metal composite structure and a second hybrid metal composite structure, the first and second hybrid metal composite structures comprising:
layers comprising a fiber composite material structure; and
at least one metal ply located between layers of the layers;
disposing a joint structure between the first hybrid metal composite structure and the second hybrid metal composite structure, comprising:
disposing a first connector structure on a first side of the first hybrid metal composite structure and the second hybrid metal composite structure and to extend between the first hybrid metal composite structure and the second hybrid metal composite structure;
disposing a second connector structure on a second opposite side of the first hybrid metal composite structure and the second hybrid metal composite structure and to extend between the first hybrid metal composite structure and the second hybrid metal composite structure;
disposing a first principal fastener to extend from the first connector structure, through the first hybrid metal composite structure, and to the second connector structure; and
disposing a second principal fastener to extend from the first connector structure, through the second hybrid metal composite structure, and to the second connector structure,
wherein each of the first and second connector structures comprises raised portions for seating the first and second principal fasteners, the raised portions extending outward from the first and second connector structures in a direction parallel to directions in which the first and second principal fasteners extend through the first and second hybrid metal composite structures; and
causing the joint structure to exert a clamping force on the first and second hybrid metal composite structures to reduce gaps between the layers of the first and second hybrid metal composite structures, between the layers and the at least one metal ply of the first and second hybrid metal composite structures, and between the joint structure and the first and second hybrid metal composite structures to less than half a thickness of the at least one metal ply.

18. The method of claim 17, wherein disposing the joint structure between the first hybrid metal composite structure and the second hybrid metal composite structure comprises:
disposing a first set of plates on opposite sides of the first hybrid metal composite structure and between the first hybrid metal composite structure and the first and second connector structures;
disposing a first set of fasteners to extend between the first set of plates and through the first hybrid metal composite structure;
disposing a second set of plates disposed on opposite sides of the second hybrid metal composite structure and between the second hybrid metal composite structure and the first and second connector structures; and disposing a second set of fasteners to extend between the first set of plates and through the first hybrid metal composite structure.

19. The method of claim 17, wherein disposing the first principal fastener through the first hybrid metal composite structure comprises extending the first principal fastener through the at least one metal ply of the first hybrid metal composite structure; and wherein disposing the second principal fastener through the second hybrid metal composite structure comprises extending the second principal fastener through the at least one metal ply of the second hybrid metal composite structure.

20. The method of claim 17, wherein causing the joint structure to exert a clamping force on the first and second hybrid metal composite structures comprises tightening the first and second principal fasteners until gaps between the layers, between the layers and the at least one metal ply, and between the joint structure and the first and second hybrid metal composite structures are reduced to less than half a thickness of the at least one metal ply.

* * * * *

UNITED STATES PATENT AND TRADEMARK OFFICE
CERTIFICATE OF CORRECTION

PATENT NO. : 10,954,891 B2  
APPLICATION NO. : 16/035020  
DATED : March 23, 2021  
INVENTOR(S) : Benjamin W. C. Garcia, Brian Christensen and David R. Nelson Page 1 of 1

It is certified that error appears in the above-identified patent and that said Letters Patent is hereby corrected as shown below:

In the Specification  
        Column 23,     Line 48,     change "BMW" to --HNIW--

In the Claims  
    Claim 2,     Column 26,     Line 13,     change "claim claim 1" to --claim 1--

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*